(12) United States Patent  
Shibasaki et al.

(10) Patent No.: US 7,560,892 B2  
(45) Date of Patent: Jul. 14, 2009

(54) METHOD OF CONTROLLING STEPPING MOTOR, APPARATUS FOR CONTROLLING STEPPING MOTOR, AND PRINTER

(75) Inventors: Yoshiaki Shibasaki, Azumino (JP); Kosaku Nobuta, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 154 days.

(21) Appl. No.: 11/732,470

(22) Filed: Apr. 3, 2007

(65) Prior Publication Data

US 2007/0267996 A1    Nov. 22, 2007

(30) Foreign Application Priority Data

Apr. 3, 2006    (JP)    ............................ P2006-101687

(51) Int. Cl.
*G05B 19/40*    (2006.01)
(52) U.S. Cl. .................. 318/685; 318/696; 318/268
(58) Field of Classification Search .................. 318/685, 318/696, 268, 269, 270, 271, 272
See application file for complete search history.

(56) References Cited

U.S. PATENT DOCUMENTS

2005/0140328 A1 *    6/2005    Nireki ........................ 318/696

FOREIGN PATENT DOCUMENTS

| JP | 5-328796 | 12/1993 |
|----|----------|---------|
| JP | 6-189598 | 7/1994 |
| JP | 8-126394 | 5/1996 |
| JP | 10-323090 | 12/1998 |
| JP | 2001-232882 | 8/2001 |
| JP | 2002-44996 | 2/2002 |
| JP | 2004-56991 | 2/2004 |

\* cited by examiner

*Primary Examiner*—Karen Masih
(74) *Attorney, Agent, or Firm*—Edwards Angell Palmer & Dodge LLP; John J. Penny, Jr.

(57) ABSTRACT

A method of controlling a stepping motor, comprising: performing a driving control of driving a rotor at a predetermined step angle; and performing a stop control of giving a driving circuit of the stepping motor a stop instruction for stopping the rotor at a position that is before or beyond a target stop position by a minuter step angle than the step angle in the driving control in a direction in which the rotor is rotated when to stop the rotor at the target stop position.

9 Claims, 17 Drawing Sheets

FIG. 9

| STEP NUMBER (M1) | A PHASE ANGLE DATA | A PHASE CODE DATA | A PHASE CURRENT RATIO (%) | B PHASE ANGLE DATA | B PHASE CODE DATA | B PHASE CURRENT RATIO (%) | 2-PHASE EXCITATION | 1-2-PHASE EXCITATION | W1-2-PHASE EXCITATION | 2W1-2-PHASE EXCITATION | 4W1-2-PHASE EXCITATION | ELECTRICAL ANGLE (°) |
|---|---|---|---|---|---|---|---|---|---|---|---|---|
| 0 | 9 | 1 | 73.91 | 9 | 1 | 73.91 | ○ | ○ | ○ | ○ | ○ | 45 |
| 1 | 8 | 1 | 69.56 | 10 | 1 | 78.26 | | | | | ○ | 39.375 |
| 2 | 7 | 1 | 60.87 | 11 | 1 | 82.61 | | | | ○ | ○ | 33.75 |
| 3 | 6 | 1 | 52.17 | 12 | 1 | 86.95 | | | | | ○ | 28.125 |
| 4 | 5 | 1 | 43.48 | 13 | 1 | 91.3 | | | ○ | ○ | ○ | 22.5 |
| 5 | 4 | 1 | 34.78 | 14 | 1 | 95.65 | | | | | ○ | 16.875 |
| 6 | 3 | 1 | 26.08 | 15 | 1 | 100 | | | | ○ | ○ | 11.25 |
| 7 | 2 | 1 | 17.39 | 15 | 1 | 100 | | | | | ○ | 5.625 |
| 8 | 0 | 1 | OFF | 15 | 1 | 100 | ○ | ○ | ○ | ○ | ○ | 0 |
| 9 | 2 | 0 | -17.39 | 15 | 1 | 100 | | | | | ○ | 354.375 |
| 10 | 3 | 0 | -26.08 | 15 | 1 | 100 | | | | ○ | ○ | 348.75 |
| 11 | 4 | 0 | -34.78 | 14 | 1 | 95.65 | | | | | ○ | 343.125 |
| 12 | 5 | 0 | -43.48 | 13 | 1 | 91.3 | | | ○ | ○ | ○ | 337.5 |
| 13 | 6 | 0 | -52.17 | 12 | 1 | 86.95 | | | | | ○ | 331.875 |
| 14 | 7 | 0 | -60.87 | 11 | 1 | 82.61 | | | | ○ | ○ | 326.25 |
| 15 | 8 | 0 | -69.56 | 10 | 1 | 78.26 | | | | | ○ | 320.625 |
| 16 | 9 | 0 | -73.91 | 9 | 1 | 73.91 | ○ | ○ | ○ | ○ | ○ | 315 |
| 17 | 10 | 0 | -78.26 | 8 | 1 | 69.56 | | | | | ○ | 309.375 |
| 18 | 11 | 0 | -82.61 | 7 | 1 | 60.87 | | | | ○ | ○ | 303.75 |
| 19 | 12 | 0 | -86.95 | 6 | 1 | 52.17 | | | | | ○ | 298.125 |
| 20 | 13 | 0 | -91.3 | 5 | 1 | 43.48 | | | ○ | ○ | ○ | 292.5 |
| 21 | 14 | 0 | -95.65 | 4 | 1 | 34.78 | | | | | ○ | 286.875 |
| 22 | 15 | 0 | -100 | 3 | 1 | 26.08 | | | | ○ | ○ | 281.25 |
| 23 | 15 | 0 | -100 | 2 | 1 | 17.39 | | | | | ○ | 275.625 |
| 24 | 15 | 0 | -100 | 0 | 1 | OFF | ○ | ○ | ○ | ○ | ○ | 270 |
| 25 | 15 | 0 | -100 | 2 | 0 | -17.39 | | | | | ○ | 264.375 |
| 26 | 15 | 0 | -100 | 3 | 0 | -26.08 | | | | ○ | ○ | 258.75 |
| 27 | 14 | 0 | -95.65 | 4 | 0 | -34.78 | | | | | ○ | 253.125 |
| 28 | 13 | 0 | -91.3 | 5 | 0 | -43.48 | | | ○ | ○ | ○ | 247.5 |
| 29 | 12 | 0 | -86.95 | 6 | 0 | -52.17 | | | | | ○ | 241.875 |
| 30 | 11 | 0 | -82.61 | 7 | 0 | -60.87 | | | | ○ | ○ | 236.25 |
| 31 | 10 | 0 | -78.26 | 8 | 0 | -69.56 | | | | | ○ | 230.625 |
| 32 | 9 | 0 | -73.91 | 9 | 0 | -73.91 | ○ | ○ | ○ | ○ | ○ | 225 |
| 33 | 8 | 0 | -69.56 | 10 | 0 | -78.26 | | | | | ○ | 219.375 |
| 34 | 7 | 0 | -60.87 | 11 | 0 | -82.61 | | | | ○ | ○ | 213.75 |
| 35 | 6 | 0 | -52.17 | 12 | 0 | -86.95 | | | | | ○ | 208.125 |
| 36 | 5 | 0 | -43.48 | 13 | 0 | -91.3 | | | ○ | ○ | ○ | 202.5 |
| 37 | 4 | 0 | -34.78 | 14 | 0 | -95.65 | | | | | ○ | 196.875 |
| 38 | 3 | 0 | -26.08 | 15 | 0 | -100 | | | | ○ | ○ | 191.25 |
| 39 | 2 | 0 | -17.39 | 15 | 0 | -100 | | | | | ○ | 185.625 |
| 40 | 0 | 0 | OFF | 15 | 0 | -100 | ○ | ○ | ○ | ○ | ○ | 180 |
| 41 | 2 | 1 | 17.39 | 15 | 0 | -100 | | | | | ○ | 174.375 |
| 42 | 3 | 1 | 26.08 | 15 | 0 | -100 | | | | ○ | ○ | 168.75 |
| 43 | 4 | 1 | 34.78 | 14 | 0 | -95.65 | | | | | ○ | 163.125 |
| 44 | 5 | 1 | 43.48 | 13 | 0 | -91.3 | | | ○ | ○ | ○ | 157.5 |
| 45 | 6 | 1 | 52.17 | 12 | 0 | -86.95 | | | | | ○ | 151.875 |
| 46 | 7 | 1 | 60.87 | 11 | 0 | -82.61 | | | | ○ | ○ | 146.25 |
| 47 | 8 | 1 | 69.56 | 10 | 0 | -78.26 | | | | | ○ | 140.625 |
| 48 | 9 | 1 | 73.91 | 9 | 0 | -73.91 | ○ | ○ | ○ | ○ | ○ | 135 |
| 49 | 10 | 1 | 78.26 | 8 | 0 | -69.56 | | | | | ○ | 129.375 |
| 50 | 11 | 1 | 82.61 | 7 | 0 | -60.87 | | | | ○ | ○ | 123.75 |
| 51 | 12 | 1 | 86.95 | 6 | 0 | -52.17 | | | | | ○ | 118.125 |
| 52 | 13 | 1 | 91.3 | 5 | 0 | -43.48 | | | ○ | ○ | ○ | 112.5 |
| 53 | 14 | 1 | 95.65 | 4 | 0 | -34.78 | | | | | ○ | 106.875 |
| 54 | 15 | 1 | 100 | 3 | 0 | -26.08 | | | | ○ | ○ | 101.25 |
| 55 | 15 | 1 | 100 | 2 | 0 | -17.39 | | | | | ○ | 95.625 |
| 56 | 15 | 1 | 100 | 0 | 0 | OFF | ○ | ○ | ○ | ○ | ○ | 90 |
| 57 | 15 | 1 | 100 | 2 | 1 | 17.39 | | | | | ○ | 84.375 |
| 58 | 15 | 1 | 100 | 3 | 1 | 26.08 | | | | ○ | ○ | 78.75 |
| 59 | 14 | 1 | 95.65 | 4 | 1 | 34.78 | | | | | ○ | 73.125 |
| 60 | 13 | 1 | 91.3 | 5 | 1 | 43.48 | | | ○ | ○ | ○ | 67.5 |
| 61 | 12 | 1 | 86.95 | 6 | 1 | 52.17 | | | | | ○ | 61.875 |
| 62 | 11 | 1 | 82.61 | 7 | 1 | 60.87 | | | | ○ | ○ | 56.25 |
| 63 | 10 | 1 | 78.26 | 8 | 1 | 69.56 | | | | | ○ | 50.625 |

FIG. 10

| ACCELERATION TIME DATA (µs) ||
|---|---|
| No.(M2) | data |
| 1 | 1818 |
| 2 | 1348 |
| 3 | 1099 |
| 4 | 935 |
| 5 | 822 |
| 6 | 754 |
| 7 | 700 |
| 8 | 654 |
| 9 | 623 |
| 10 | 595 |
| 11 | 566 |
| 12 | 542 |
| 13 | 519 |
| 14 | 498 |
| 15 | 482 |
| 16 | 467 |
| 17 | 457 |
| 18 | 446 |
| 19 | 436 |
| 20 | 427 |
| 21 | 418 |
| 22 | 411 |
| 23 | 403 |
| 24 | 395 |
| 25 | 388 |
| 26 | 381 |
| 27 | 375 |
| 28 | 368 |
| 29 | 362 |
| 30 | 356 |
| 31 | 351 |
| 32 | 345 |
| . | . |
| . | . |
| . | . |

FIG. 12

| STEP NUMBER | ALIGNMENT OPERATION TIME DATA (µs) | | | |
|---|---|---|---|---|
| | 2-PHASE EXCITATION | 1-2-PHASE EXCITATION | W1-2-PHASE EXCITATION | 2W1-2-PHASE EXCITATION |
| | data | data | data | data |
| 1 | 880 | 1760 | 3520 | 7040 |
| 2 | 880 | 1760 | 3520 | 7040 |
| 3 | 880 | 1760 | 3520 | 7040 |
| 4 | 880 | 1760 | 3520 | 7040 |
| 5 | 880 | 1760 | 3520 | 7040 |
| 6 | 880 | 1760 | 3520 | 7040 |
| 7 | 880 | 1760 | 3520 | 7040 |
| 8 | 880 | 1760 | 3520 | 7040 |

FIG. 13

| STEP NUMBER | PRELIMINARY ACCELERATION TIME DATA (µs) | | | |
|---|---|---|---|---|
| | 2-PHASE EXCITATION | 1-2-PHASE EXCITATION | W1-2-PHASE EXCITATION | 2W1-2-PHASE EXCITATION |
| | data | data | data | data |
| 1 | 880 | 1760 | 3520 | 7040 |
| 2 | 845 | 1690 | 3380 | 6760 |
| 3 | 812 | 1624 | 3248 | 6496 |
| 4 | 781 | 1562 | 3124 | 6248 |
| 5 | 753 | 1506 | 3012 | 6024 |
| 6 | 727 | 1454 | 2908 | 5816 |
| 7 | 694 | 1388 | 2776 | 5552 |
| 8 | 672 | 1344 | 2688 | 5376 |

FIG. 15

| DECELERATION TIME DATA (µs) | |
|---|---|
| No. | data |
| . | . |
| . | . |
| . | . |
| 32 | 316 |
| 31 | 323 |
| 30 | 329 |
| 29 | 337 |
| 28 | 343 |
| 27 | 352 |
| 26 | 360 |
| 25 | 371 |
| 24 | 383 |
| 23 | 395 |
| 22 | 407 |
| 21 | 419 |
| 20 | 433 |
| 19 | 448 |
| 18 | 466 |
| 17 | 484 |
| 16 | 503 |
| 15 | 522 |
| 14 | 545 |
| 13 | 569 |
| 12 | 597 |
| 11 | 629 |
| 10 | 662 |
| 9 | 701 |
| 8 | 749 |
| 7 | 814 |
| 6 | 894 |
| 5 | 994 |
| 4 | 1121 |
| 3 | 1316 |
| 2 | 1603 |
| 1 | 2101 |

FIG. 16

| STEP NUMBER | STOP OPERATION TIME DATA (µs) | | | |
|---|---|---|---|---|
| | 2-PHASE EXCITATION | 1-2-PHASE EXCITATION | W1-2-PHASE EXCITATION | 2W1-2-PHASE EXCITATION |
| | data | data | data | data |
| 16 | 517 | 1034 | 2068 | 4136 |
| 15 | 558 | 1116 | 2232 | 4464 |
| 14 | 584 | 1168 | 2336 | 4672 |
| 13 | 601 | 1202 | 2404 | 4808 |
| 12 | 631 | 1262 | 2524 | 5048 |
| 11 | 651 | 1302 | 2604 | 5208 |
| 10 | 679 | 1358 | 2716 | 5432 |
| 9 | 710 | 1420 | 2840 | 5680 |
| 8 | 710 | 1420 | 2840 | 5680 |
| 7 | 710 | 1420 | 2840 | 5680 |
| 6 | 710 | 1420 | 2840 | 5680 |
| 5 | 710 | 1420 | 2840 | 5680 |
| 4 | 710 | 1420 | 2840 | 5680 |
| 3 | 710 | 1420 | 2840 | 5680 |
| 2 | 710 | 1420 | 2840 | 5680 |
| 1 | 710 | 1420 | 2840 | 5680 |

Steps 16–9: FIRST STOP CONTROL
Steps 8–1: SECOND STOP CONTROL

METHOD OF CONTROLLING STEPPING MOTOR, APPARATUS FOR CONTROLLING STEPPING MOTOR, AND PRINTER

BACKGROUND

1. Technical Field

The present invention relates to a method of controlling a stepping motor, an apparatus for controlling a stepping motor, and a printer.

2. Related Art

In the related art, in ink jet printers for performing printing on, for example, printing sheets, a stepping motor has been used as a feed motor for rotating a feed roller to transport the printing sheets (for example, see Patent Document 1 and Patent Document 2). A stepping motor used in the ink jet printers disclosed in Patent Document 1 and Patent Document 2 is a 2-phase stepping motor including A-phase and B-phase magnetic pole sets arranged with a phase difference therebetween corresponding to an electrical angle of 90° and driving coils wound around the two magnetic pole sets. In addition, ink jet printers using DC (direct current) motors as feed motors for transporting printing sheets have been proposed (for example, see Patent Document 3).

As disclosed in Patent Document 3, the printer using the DC motor as the feed motor is generally provided with a rotary encoder for controlling a process of transporting printing sheets. Therefore, the printer using the DC motor as the feed motor can perform printing with high resolution by using the rotary encoder, as compared to printers using stepping motors as the feed motors (that is, the printer can transport printing sheets with high resolution). In contrast, the printer using the DC motor needs to have the rotary encoder, which causes the manufacturing costs of the printer including the DC motor to be higher than those of the printer including the stepping motor. Therefore, in general, the stepping motor is used as a feed motor of a relatively inexpensive printer not requiring high-resolution printing.

Patent Document 1: JP-A-2004-56991
Patent Document 2: JP-A-10-323090
Patent Document 3: JP-A-2001-232882

In recent years, demands for inexpensive and high-resolution printers have increased on the market. However, in the stepping motor, a step angle is determined by the number of magnetic poles (pole teeth), and resolution is determined by the step angle. Therefore, there are limitations in improving the resolution of the stepping motor by a change in the mechanical structure of the stepping motor. In addition, it is possible to increase the gear ratio of gears connected to the stepping motor and the feed roller to improve the resolution of the stepping motor, which causes the transport speed of printing sheets to be lowered, resulting in a low printing speed.

The 2-phase stepping motor can be driven in any one of the following excitation modes to transport printing sheets with high resolution: a 1-2-phase excitation mode that rotates a rotor at a step angle of 45°, which is an electrical angle, in theory; a W1-2-phase excitation mode that rotates a rotor at a step angle of 22.5°, which is an electrical angle, in theory; and a 2W1-2-phase excitation mode that rotates a rotor at a step angle of 11.25°, which is an electrical angle, in theory.

However, the inventors' studies show that, when a general stepping motor driving circuit is used to driving a stepping motor, for example, as shown in FIG. 18, although the theoretical rotational position of the rotor is θ1 in electrical angle, the actual rotational position of the rotor specified by a current actually supplied to the driving coil wound around the A-phase magnetic pole set and a current actually supplied to the driving coil wound around the B-phase magnetic pole set is θ2 in electrical angle. That is, there is a place where a resultant vector V20 of a current value C100A that is actually supplied to the A-phase magnetic pole set and a current value C100B that is actually supplied to the driving coil wound around the B-phase magnetic pole set is not equal to a theoretical resultant vector V10.

In addition to the driving characteristics of the stepping motor, the printer provided with the stepping motor is affected by mechanical loads, such as loads between gears connecting the stepping motor and the feed roller, a transport load of the printing sheet, and detent torque, which is residual torque generated when no current is supplied to the driving coils. Therefore, the inventors' studies show that, during the driving of the stepping motor in the 1-2-phase excitation mode, the W1-2-phase excitation mode, or the 2W1-2-phase excitation mode, the stop accuracy of the rotor is considerably lowered when the rotor stops at positions other than the stop position of the rotor in the 2-phase excitation mode of the stepping motor. That is, when the rotor stops at positions other than the position corresponding to an electrical angle of 45°, 135°, 225°, or 315° shown in FIG. 18, the stop accuracy of the rotor is considerably lowered. As a result, it is difficult to perform printing with high resolution.

The inventors' studies prove that, even when the rotor stops at positions other than the stop position of the rotor in the 2-phase excitation mode of the stepping motor, a predetermined control process makes it possible to prevent the stop accuracy of the rotor from being lowered.

SUMMARY

An advantage of some aspects of the invention is to provide a method and apparatus for controlling a stepping motor capable of being driven with high resolution and preventing a reduction in stop accuracy. Another advantage of some aspects of the invention is to provide an inexpensive and high-resolution printer. The advantage can be attained by at least one of the following aspects:

a first aspect of the invention provides a method of controlling a stepping motor, comprising: performing a driving control of driving a rotor at a predetermined step angle; and performing a stop control of giving a driving circuit of the stepping motor a stop instruction for stopping the rotor at a position that is before or beyond a target stop position by a minuter step angle than the step angle in the driving control in a direction in which the rotor is rotated when to stop the rotor at the target stop position.

In the first aspect, in the stop control process, the stop instruction for stopping the rotor at a position that is before or beyond the target stop position by a minuter step angle than the step angle in the driving control process in the direction in which the rotor is rotated is given to the driving circuit of the stepping motor to stop the rotor at the target stop position. Therefore, for example, even when the stepping motor is driven in a 1-2-phase excitation mode, a W1-2-phase excitation mode, or a 2W1-2-phase excitation mode to improve the resolution, it is possible to prevent the lowering of stop accuracy.

A second aspect of the invention provides a method of controlling a 2-phase stepping motor including A-phase and B-phase magnetic pole sets arranged with a phase difference corresponding to an electrical angle of 90° and driving coils wound around each of the two magnetic pole sets, the method comprising: if a stop position of a rotor is referred to as a stable position when the stepping motor is driven in a 2-phase excitation mode in which the rotor is theoretically rotated at a step angle of 90° in electrical angle, and stop positions of the rotors except for the stable position are referred to as unstable positions when the stepping motor is driven in an excitation mode in which the rotor is theoretically rotated at a step angle of $(360/2^{(n1+2)})°$ in electrical angle wherein n1 is an integer equal to or greater than 1, performing a driving control of driving the stepping motor in an excitation mode in which the rotor is theoretically rotated at a step angle of $(360/2^{(n2+2)})°$ in electrical angle wherein n2 is an integer equal to or greater than 1; and after the driving control, when the rotor stops at the target stop position that is the unstable position, performing a stop control of giving a driving circuit of the stepping motor a stop instruction for stopping the rotor at a position that is before or beyond the target stop position by, theoretically, a step angle of $(360/2^{(n2+n3)})°$ in electrical angle in a direction in which the rotor is rotated wherein n3 is an integer equal to or greater than 3.

In the second aspect, in the driving control process, the stepping motor is driven in an excitation mode in which the rotor is theoretically rotated at a step angle of $(360/2^{(n2+2)})°$. That is, in the driving control process, the stepping motor is driven in a 1-2-phase excitation mode in which the rotor 41 is theoretically rotated at a step angel of 45°, which is an electrical angle, a W1-2-phase excitation mode in which the rotor 41 is theoretically rotated at a step angel of 22.5°, which is an electrical angle, or a 2W1-2-phase excitation mode in which the rotor 41 is rotated theoretically rotated at a step angel of 11.25°, which is an electrical angle. Therefore, even when the mechanical resolution of the stepping motor is lowered, it is possible to drive the stepping motor with high resolution.

In the second aspect, in the stop control process, in order to stop the rotor at a target stop position that is the unstable position, after the stepping motor is driven in the excitation mode in which the rotor is theoretically rotated at the step angle of $(360/2^{(n2+2)})°$ in electrical angle, the stop instruction for stopping the rotor at a position that is before or beyond the target stop position by, theoretically, a step angle of $(360/2^{(n2+n3)})°$ in electrical angle, is given to the driving circuit of the stepping motor. That is, in the stop control process, the stop instruction for stopping the rotor at a position that is before or beyond the target stop position by a minuter step angle than the step angle in the driving control process is given to the driving circuit of the stepping motor. Therefore, it is possible to prevent the lowering of stop accuracy while improving the resolution of the stepping motor.

In the control method according to the second aspect, preferably, the stop instruction is a control instruction for stopping the rotor at a position that is before or beyond the target stop position by, theoretically, a step angle of $(360/2^{(n2+3)})°$ in electrical angle, in the direction in which the rotor is rotated. According to this structure, a control process of generating a stop instruction for stopping the rotor at a position that is before or beyond the target stop position by half the step angle in the driving control process may be performed, which results in a simple control process.

In the control method according to the second aspect, preferably, in the stop control process, the stop instruction is given to the driving circuit to stop the rotor at the stable position and the unstable position. According to the above-mentioned structure, it is possible to perform the stop control process without considering the stop position of the rotor, which results in a simple control process.

A third aspect of the invention provides an apparatus for controlling a stepping motor, comprising: a driving unit that rotates a rotor at a predetermined step angle; and an instruction unit that gives the driving unit a stop instruction for stopping the rotor at a position that is before or beyond a target stop position by a minuter step angle than the step angle during the rotation of the rotor in a direction in which the rotor is rotated to stop the rotor at the target stop position.

According to the third aspect, the control apparatus includes the instruction unit that gives the driving unit a stop instruction for stopping the rotor at a position that is before or beyond the target stop position by a minuter step angle than the step angle during the rotation of the rotor in a direction in which the rotor is rotated to stop the rotor at the target stop position. Therefore, for example, even when the stepping motor is driven in the 1-2-phase excitation mode, the W1-2-phase excitation mode, or the 2W1-2-phase excitation mode to improve the resolution, it is possible to prevent the lowering of stop accuracy.

A fourth aspect of the invention provides an apparatus for controlling a 2-phase stepping motor including A-phase and B-phase magnetic pole sets arranged with a phase difference corresponding to an electrical angle of 90° and driving coils wound around each of the two magnetic pole sets, the apparatus comprising: if a stop position of a rotor is referred to as a stable position when the stepping motor is driven in a 2-phase excitation mode in which the rotor is theoretically rotated at a step angle of 90° in electrical angle, and stop positions of the rotor other than the stable position are referred to as unstable positions when the stepping motor is driven in an excitation mode in which the rotor is theoretically rotated at a step angle of $(360/2^{(n1+2)})°$ in electrical angle wherein n1 is an integer equal to or greater than 1, a driving unit that drives the stepping motor in an excitation mode in which the rotor is theoretically rotated at a step angle of $(360/2^{(n2+2)})°$ in electrical angle wherein n2 is an integer equal to or greater than 1; and an instruction unit that, in order to stop the rotor at a target stop position that is the unstable position, after the driving unit drives the stepping motor in the excitation mode in which the rotor is theoretically rotated at the step angle of $(360/2^{(n2+2)})°$ in electrical angle, gives the driving unit a stop instruction for stopping the rotor at a position that is before or beyond the target stop position by, theoretically, a step angle of $(360/2^{(n2+n3)})°$ in electrical angle in a direction in which the rotor is rotated wherein n3 is an integer equal to or greater than 3.

In the fourth aspect, the driving unit drives the stepping motor in an excitation mode in which the rotor is theoretically rotated at a step angle of $(360/2^{(n2+2)})°$. According to the above-mentioned structure, it is possible to drive the stepping motor with high resolution. Further, in the control apparatus according to the above-mentioned aspect, in order to stop the rotor at a target stop position, which is the unstable position, after the driving unit drives the stepping motor in the excitation mode in which the rotor is theoretically rotated at the step angle of $(360/2^{(n2+2)})°$ in electrical angle, the instruction unit gives the driving unit the stop instruction for stopping the rotor at a position that is before or beyond the target stop position by, theoretically, a step angle of $(360/2^{(n2+n3)})°$ in electrical angle. That is, the instruction unit gives the driving unit the stop instruction for stopping the rotor at a position that is before or beyond the target stop position by a minuter step angle than the step angle during the rotation of the rotor. Therefore, it is possible to prevent the lowering of stop accuracy while improving the resolution of the stepping motor.

According to fifth aspect of the invention, a printer includes a stepping motor controlled by the control method according to the first or the second aspects or a stepping motor controlled by the control apparatus according to the third or the fourth aspect as a motor for transporting a printing medium. The stepping motor controlled by the control method according to the first or the second aspect or the stepping motor controlled by the control apparatus according to the third or the fourth aspect can prevent the lowering of stop accuracy even when the resolution thereof is improved. Therefore, the printer having the stepping motor as a paper feed motor can have high resolution. In addition, according to the fifth aspect, the printer can have lower manufacturing costs than a printer having a DC motor as the paper feed motor.

In the printer according to the fifth aspect, preferably, the stop instruction is a control instruction for stopping the rotor at a position that is beyond the target stop position in the direction in which the rotor is rotated. In the printer according to the above-mentioned aspect, the rotor of the stepping motor is likely to stop before a target stop position due to mechanical loads, such as loads between gears connecting the stepping motor and the feed roller and a transport load of the printing sheet. Therefore, according to the above-mentioned structure, the printer can effectively prevent the lowering of stop accuracy.

The present disclosure relates to the subject matter contained in Japanese patent application No. 2006-101687 filed on Apr. 3, 2006, which is expressly incorporated herein by reference in its entirety.

BRIEF DESCRIPTION OF THE DRAWINGS

The invention will be described with reference to the accompanying drawings, wherein like numbers reference like elements.

FIG. 9 is a diagram illustrating a current ratio calculation table stored in a control logic circuit shown in FIG. 6.

FIG. 10 is a diagram illustrating an acceleration table of the PF motor stored in a ROM shown in FIG. 4.

FIG. 12 is a diagram illustrating an alignment operation table of the PF motor stored in the ROM shown in FIG. 4.

FIG. 13 is a diagram illustrating a preliminary acceleration table of the PF motor stored in the ROM shown in FIG. 4.

FIG. 15 is a diagram illustrating a deceleration table of the PF motor stored in the ROM shown in FIG. 4.

FIG. 16 is a diagram illustrating a stop operation table of the PF motor stored in the ROM shown in FIG. 4.

DESCRIPTION OF EXEMPLARY EMBODIMENTS

Hereinafter, a stepping motor control method, a stepping motor control apparatus, and a printer according to exemplary embodiments of the invention will be described with reference to the accompanying drawings.

[Schematic Structure of Printer]

Figure 1:
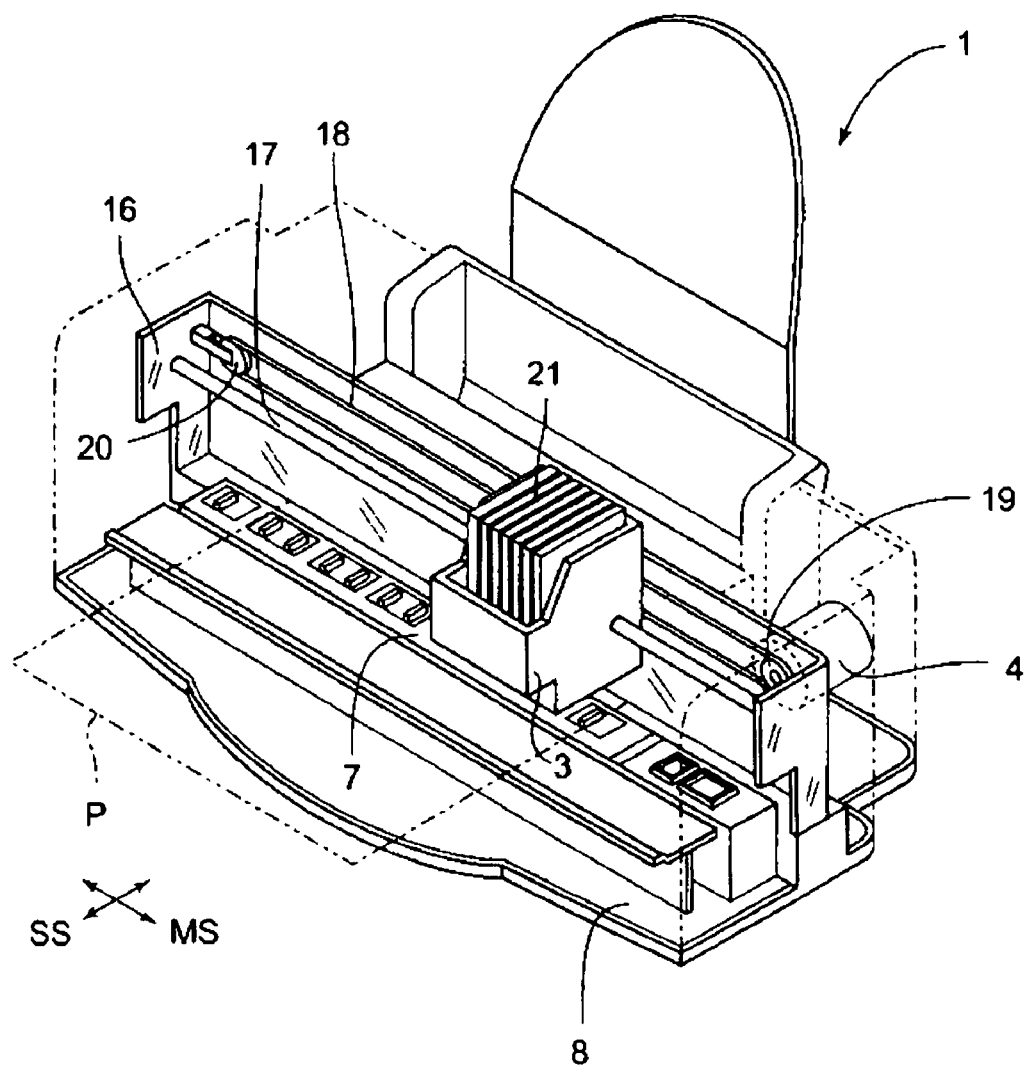
FIG. 1 is a perspective view schematically illustrating the structure of a printer according to an embodiment of the invention.
Figure 2:
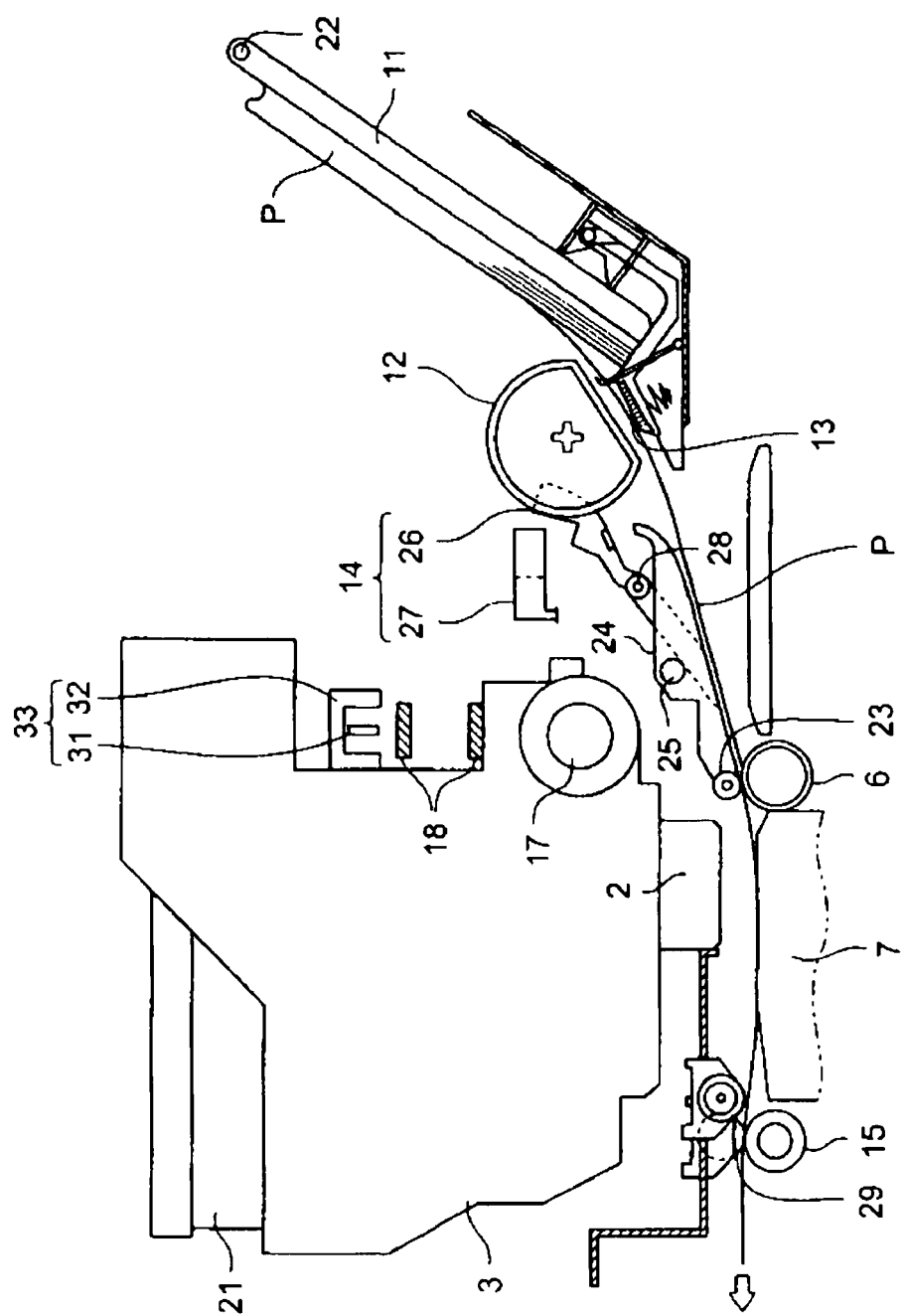
FIG. 2 is a side view schematically illustrating the structure of a portion of the printer shown in FIG. 1 related to the transport of sheets.
Figure 3:
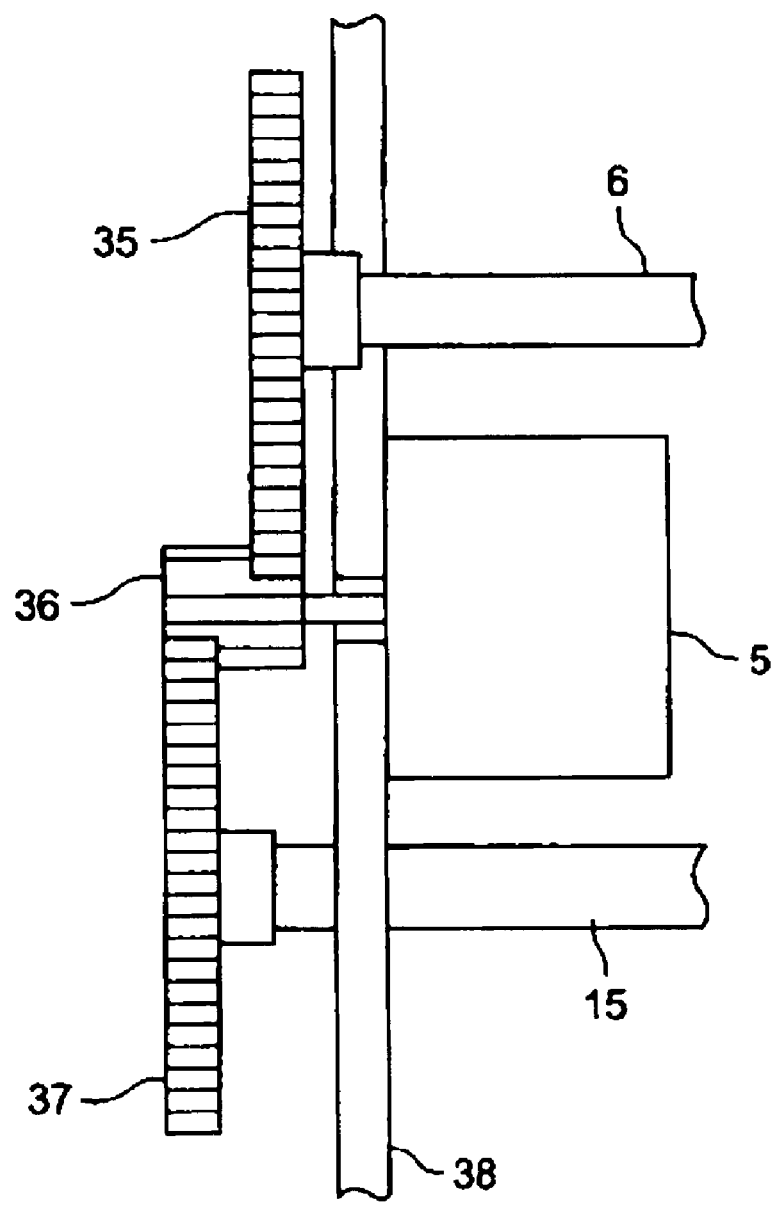
FIG. 3 is an enlarged plan view illustrating a driving unit for a PF driving roller shown in FIG. 2.

FIG. 1 is a perspective view schematically illustrating the structure of a printer 1 according to an embodiment of the invention. FIG. 2 is a side view schematically illustrating the structure of a sheet transport portion of the printer 1 shown in FIG. 1. FIG. 3 is an enlarged plan view illustrating a driving portion of a PF driving roller 6 shown in FIG. 2.

The printer 1 according to this embodiment is an ink jet type in which liquid ink is discharged onto a printing sheet P, which is a printing medium, to perform printing. As shown in FIGS. 1 to 3, the printer 1 includes a carriage 3 having a printing head 2 for discharging liquid droplets mounted therein, a carriage motor (CR motor) 4 for driving the carriage 3 in a main scanning direction MS, a paper feed motor (PF motor) 5, serving as a paper transport motor for transporting the printing sheet P in a sub-scanning direction SS (see FIG. 3), a PF driving roller 6 connected to the PF motor 5, a platen 7 that is displaced opposite to an ink discharge surface (a lower surface of FIG. 2) of the printing head 2, and a body chassis 8 for housing these components therein. The CR motor 4 according to this embodiment is a DC motor. In addition, the PF motor 5 according to this embodiment is a stepping motor. The CR motor 4 may be a stepping motor.

As shown in FIG. 2, the printer 1 includes a hopper 11 on which the printing sheet P before printing is loaded, a paper feed roller 12 and a separating pad 13 for feeding the printing sheet P loaded on the hopper 11 into the printer 1, a paper detecting device 14 for detecting the passage of the printing sheet P from the hopper 11 into the printer 1, and a paper discharge driving roller 15 for discharging the printing sheet P from the inside of the printer 1 to the outside.

The carriage 3 can be reciprocated in the main scanning direction MS by a guide shaft 17 supported to a supporting frame 16 fixed to the body chassis 8 and a timing belt 18. That is, a portion of the timing belt 18 is fixed to the carriage 3 (see FIG. 2), and the timing belt is wound around a pulley 19 fitted to an output shaft of the CR motor 4 and a pulley 20 rotatably fitted to the supporting frame 16 to have a predetermined tension. The guide shaft 17 slidably supports the carriage 3 such that the carriage can be guided in the main scanning direction MS. The carriage 3 is provided with an ink cartridge 21 containing various color inks to be supplied to the printing head 2 in addition to the printing head 2.

The paper feed roller 12 is connected to the PF motor 5 through a gear (not shown) and is driven by the PF motor 5. As shown in FIG. 2, the hopper 11 is a plate member capable of being loaded with the printing sheet P, and can be rocked on a rotating shaft 22 provided at the top thereof by a cam mechanism (not shown). The rocking of the hopper 11 by the cam mechanism causes a lower end of the hopper 11 to elastically come into pressure contact with the paper feed roller 12 or to be separated from the paper feed roller 12. The separating pad 13 is formed of a member having a large friction coefficient, and is displaced opposite to the paper feed roller 12.

When the paper feed roller 12 is rotated, the surface of the paper feed roller 12 comes into pressure contact with the separating pad 13. Therefore, when the paper feed roller 12 is rotated, a first printing sheet P among the printing sheets P loaded on the hopper 11 passes through a portion where the surface of the paper feed roller 12 comes into pressure contact with the separating pad 13 to be transported to a discharge side. However, the second printing sheet P and the other printing sheets P loaded on the hopper 11 are prevented from being transported to the discharge side by the separating pad 13.

The PF driving roller 6 is connected to the PF motor 5 on the rear side of the plane of FIG. 2. That is, as shown in FIG. 3, the PF driving roller 6 is connected to the PF motor 5 through a large gear 35 of the PF driving roller 6 that is provided on the rear side of the plane of FIG. 2 and a small gear 36 that is coupled to an output shaft of the PF motor 5 so as to be engaged with the large gear 35. In this embodiment, the gear ratio of the large gear 35 and the small gear 36 is 1:7.5. In addition, the PF driving roller 6 is one inch in circumference.

As shown in FIG. 2, the printer 1 is provided with a PF driven roller 23 for transporting the printing sheet P together with the PF driving roller 6. The PF driven roller 23 is rotatably provided on the sheet discharge side of a driven roller holder 24 that is configured to be rocked on a rotating shaft 25. The driven roller holder 24 is urged in the counterclockwise direction of FIG. 2 by a spring (not shown) such that the PF driven roller 23 is always urged to the PF driving roller 6. In this way, when the PF driving roller 6 is driven, both the PF driving roller 6 and the PF driven roller 23 rotate.

As shown in FIG. 2, the paper detecting device 14 includes a detection lever 26 and a photo sensor 27, and is provided in the vicinity of the driven roller holder 24. The detection lever 26 is rotatable on a rotating shaft 28. When the printing sheet P shown in FIG. 2 completely passes through the lower side of the detection lever 26, the detection lever 26 rotates in the counterclockwise direction. When the detection lever 26 rotates, light emitted from a light emitting element (not shown) of the photo sensor 27 to a light receiving element (not shown) is shielded, which makes it possible to detect that the printing sheet P has completely passed.

The paper discharge driving roller 15 is arranged on the paper discharge side of the printer 1, and is connected to the PF motor 5 on the rear side of the plane of FIG. 2. That is, as shown in FIG. 3, the paper discharge driving roller 15 is connected to the PF motor 5 through a large gear 37 of the paper discharge driving roller 15 that is provided on the rear side of the plane of FIG. 2 and the small gear 36 that is engaged with the large gear 37. In this embodiment, the gear ratio of the large gear 37 and the small gear 36 is 1:7.5, similar to the gear ratio of the large gear 35 to the small gear 36. In addition, the paper discharge driving roller 15 is one inch in circumference.

As shown in FIG. 2, the printer 1 is provided with a paper discharge driven roller 29 for discharging the printing sheet P together with the paper discharge driving roller 15. Similar to the PF driven roller 23, the paper discharge driven roller 29 is always urged to the paper discharge driving roller 15 by a spring (not shown). Therefore, when the paper discharge driving roller 15 is driven, both the paper discharge driving roller 15 and the paper discharge driven roller 29 rotates.

As shown in FIG. 2, the printer 1 is provided with a linear encoder 33 including a linear scale 31 and a photo sensor, and the linear encoder 33 detects the position and speed of the carriage 3 in the main scanning direction MS. As shown in FIG. 2, the photo sensor 32 is fixed to the rear surface of the carriage 3 (the rear surface of the plane of FIG. 1). The linear scale 31 is attached to the supporting frame 16 in parallel to the main scanning direction MS. When a stepping motor is used as the CR motor 4, the linear encoder 33 is not needed.

As shown in FIG. 3, the PF motor 5 is fixed to an attachment bracket 38 formed of resin. The attachment bracket 38 is attached to the supporting frame 16 on the rear side of the plane of FIG. 2.

In the printer 1, the PF driving roller 6 driven by the PF motor 5 transports the printing sheet P fed into the printer 1 from the hopper 11 by the paper feed roller 12 or the separating pad 13 in the sub-scanning direction SS, and the carriage 3 driven by the CR motor 4 reciprocates the printing sheet P in the main scanning direction MS. When the carriage 3 is reciprocated, ink droplets are discharged from the printing head 2 onto the printing sheet P to perform printing. In addition, when the printing is completely performed on the printing sheet P, the printing sheet P is discharged to the outside of the printer 1 by, for example, the paper discharge driving roller 15.

[Schematic Structure of Control Unit of Printer]

Figure 4:
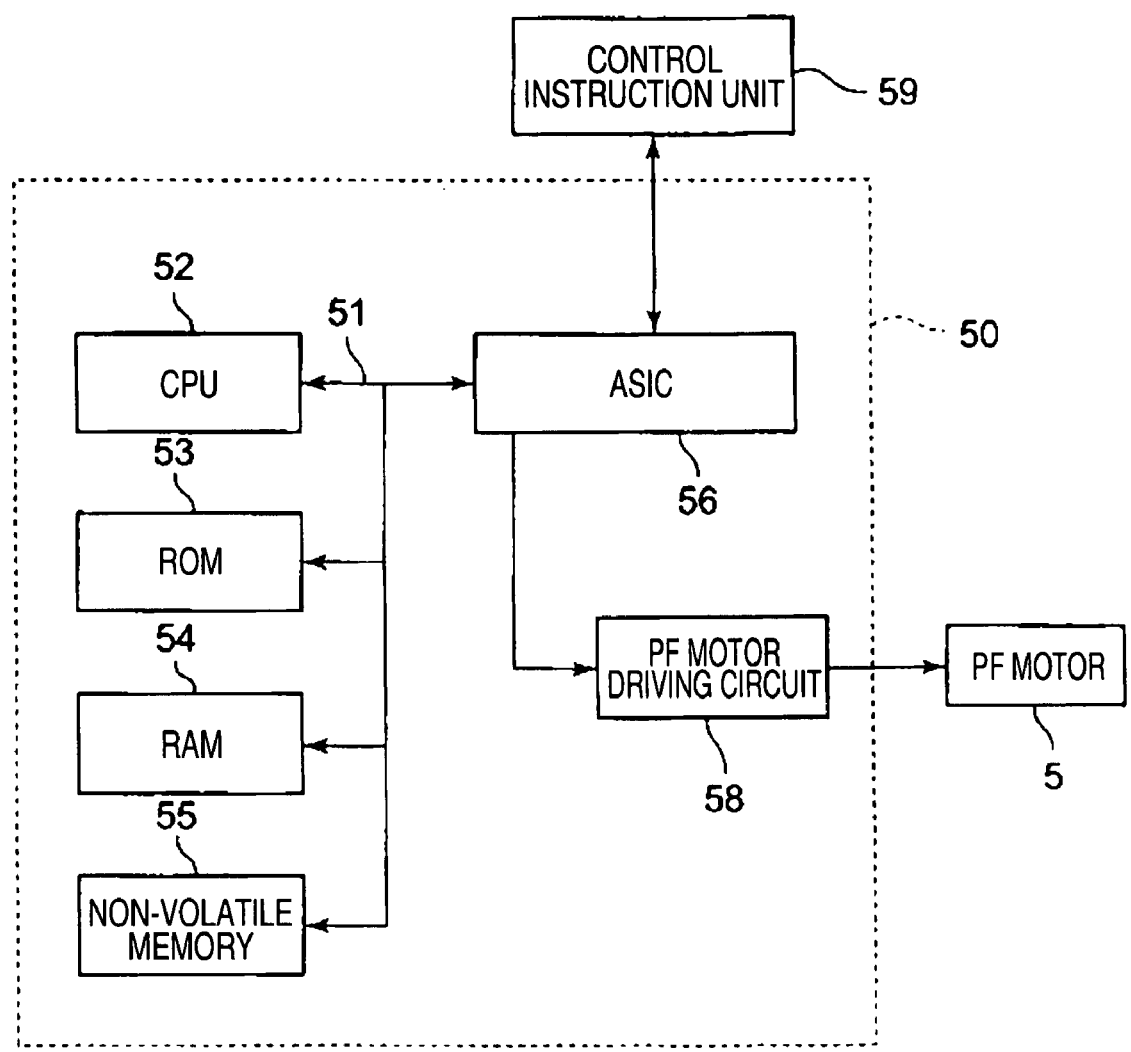
FIG. 4 is a block diagram schematically illustrating the structure of a control unit of the printer shown in FIG. 1 and peripheral devices thereof.

FIG. 4 is a block diagram schematically illustrating the structure of a control unit 50 and peripheral devices of the printer 1 shown in FIG. 1. FIG. 4 shows only the structure of the control unit 50 related to the control of the PF motor 5.

As shown in FIG. 4, the control unit 50 for controlling the PF motor 5 includes, for example, a bus 51, a CPU 52, a ROM 53, a RAM 54, a non-volatile memory 55, an ASIC 56, and a PF motor driving circuit 58.

The bus 51 is a signal line connecting the components of the control unit 50. For example, the CPU 52, the ROM 53, the RAM 54, the non-volatile memory 55, and the ASIC 56 are connected to one another by the bus 51, so that various types of signals are transmitted among the components. The CPU 52 performs a process of executing control programs of the printer 1 stored in, for example, the ROM 53 and the non-volatile memory 55, and other necessary processes. In addition, the ROM 53 stores control programs for controlling the printer 1 and data required for processes. The RAM 54 temporarily stores the program being executed by the CPU 52 and data being processed. The non-volatile memory 55 stores various data that needs to be maintained after the supply of power to the printer 1 is shut off.

The ASIC 56 outputs control instructions used to control the PF motor 5 as digital signals. More specifically, the ASIC 56 outputs various signals as control instructions on the basis of various types of data stored in the ROM 53 or the non-volatile memory 55, or on the basis of processes performed by the CPU 52. In addition, the ASIC 56 is provided in an interface circuit, and is configured to receive printing instructions supplied from a control instruction unit 59 composed of, for example, a personal computer.

The PF motor driving circuit 58 is a driving circuit of the PF motor 5 for driving the PF motor 5 on the basis of the control instruction from the ASIC 56. In this embodiment, the PF motor driving circuit 58 serves as a driving unit for driving the PF motor 5 at a predetermined step angle. The details of the PF motor driving circuit 58 will be described later.

In this embodiment, the CPU 52, the ROM 53, the RAM 54, the non-volatile memory 55, and the ASIC 56 form an instruction device for giving the control instructions to the PF motor driving circuit 58 (driving unit). In addition, in this embodiment, the PF motor driving circuit 58, serving as the driving unit, and the instruction device including the CPU 52, the ROM 53, the RAM 54, the non-volatile memory 55, and the ASIC 56 form a control device of the PF motor 5, which is a stepping motor.

[Schematic Structure of PF Motor and PF Motor Driving Circuit]

Figure 5:
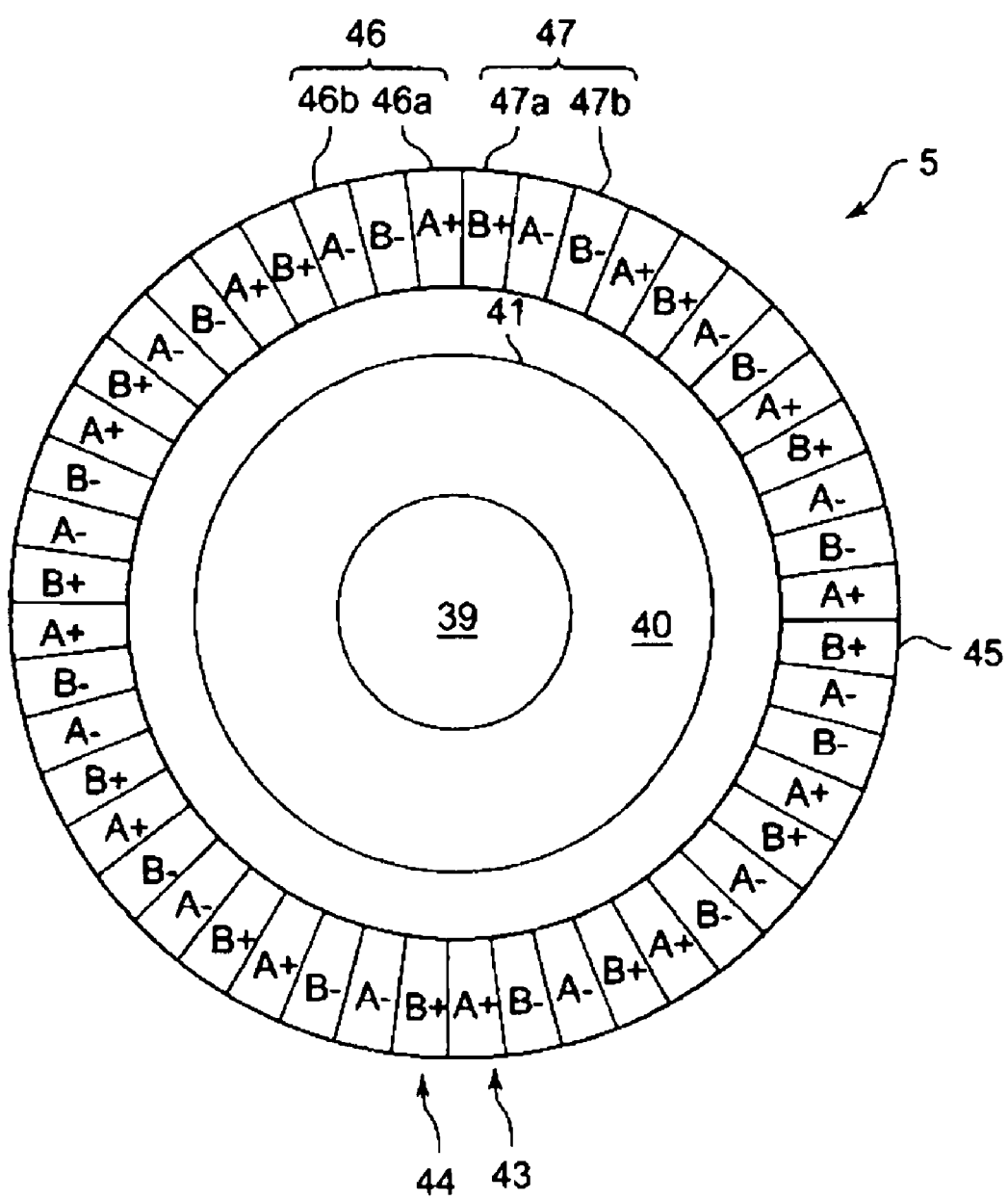
FIG. 5 is a diagram schematically illustrating main parts of a PF motor shown in FIG. 3.
Figure 6:
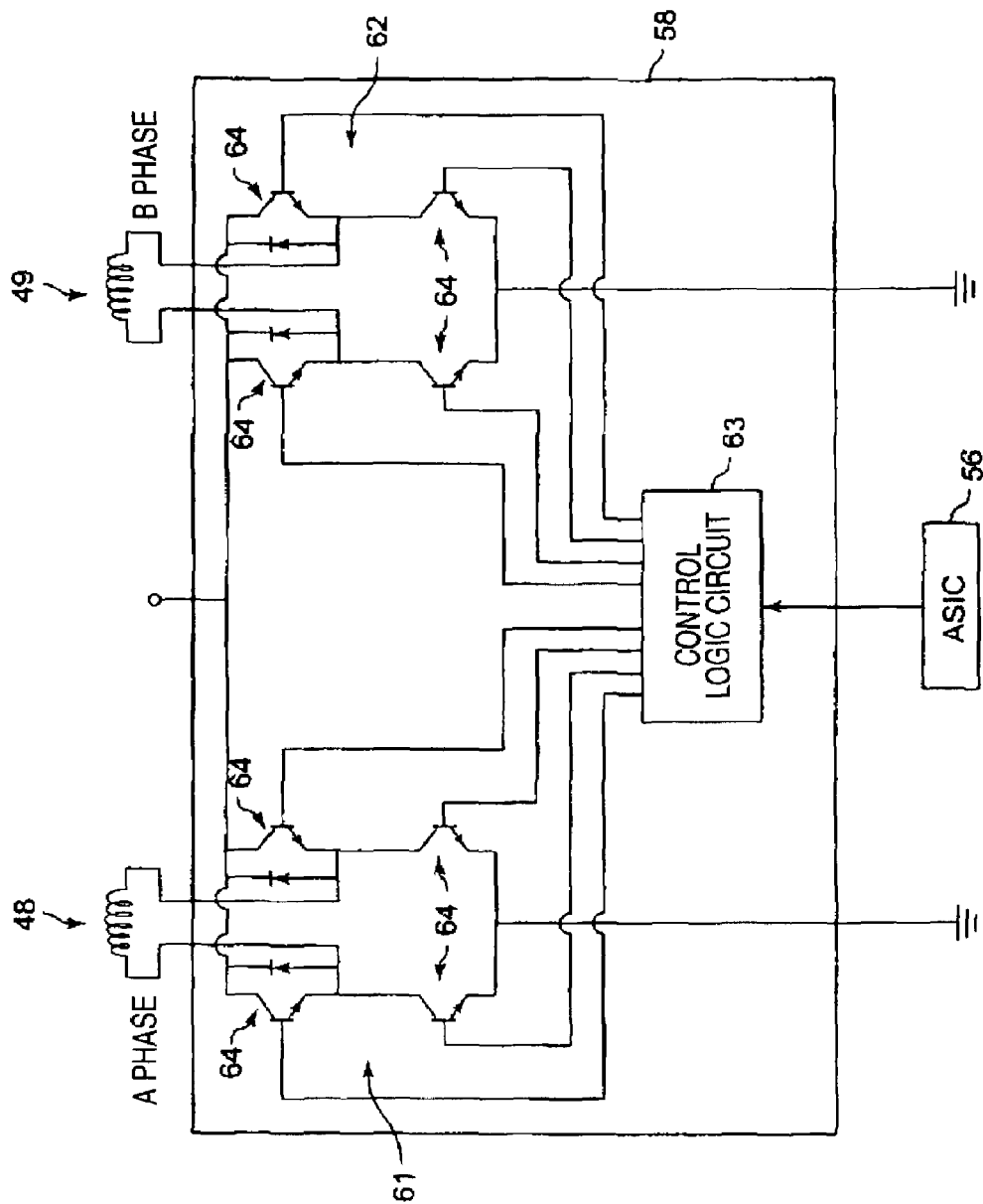
FIG. 6 is a circuit diagram schematically illustrating the structure of a PF motor driving circuit shown in FIG. 4.
Figure 7:
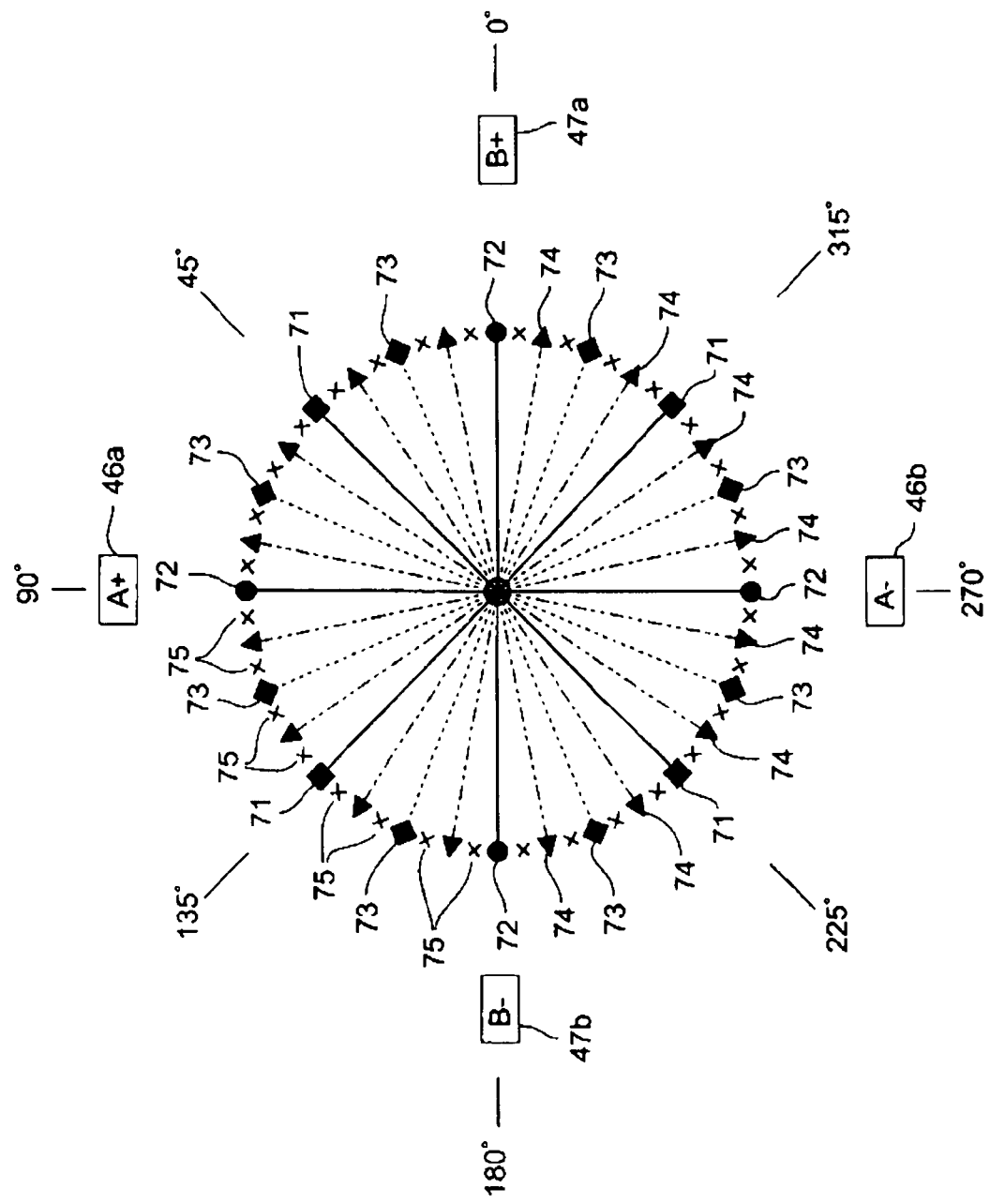
FIG. 7 is a diagram illustrating a step angle and a stop position when the PF motor shown in FIG. 3 is driven in various excitation modes.
Figure 8A:
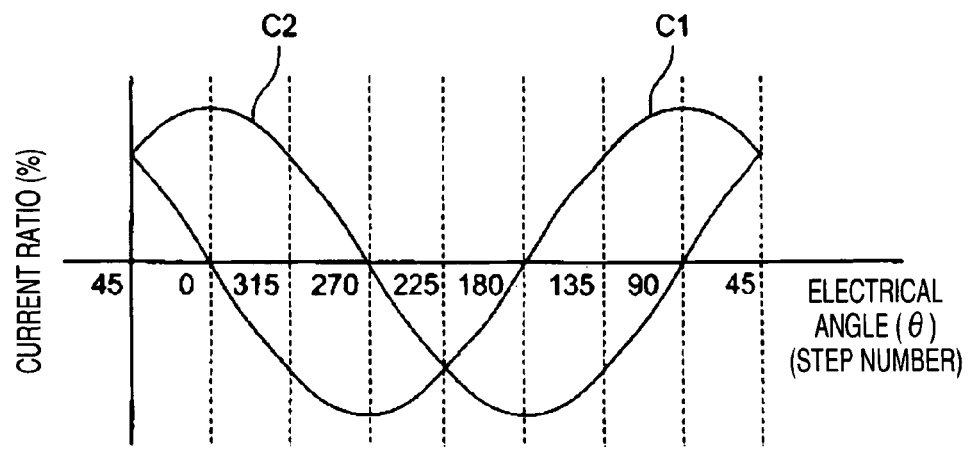
FIGS. 8A and 8B are diagrams illustrating ideal waveforms of currents supplied to an A-phase driving coil and a B-phase driving coil shown in FIG. 6.
Figure 8B:
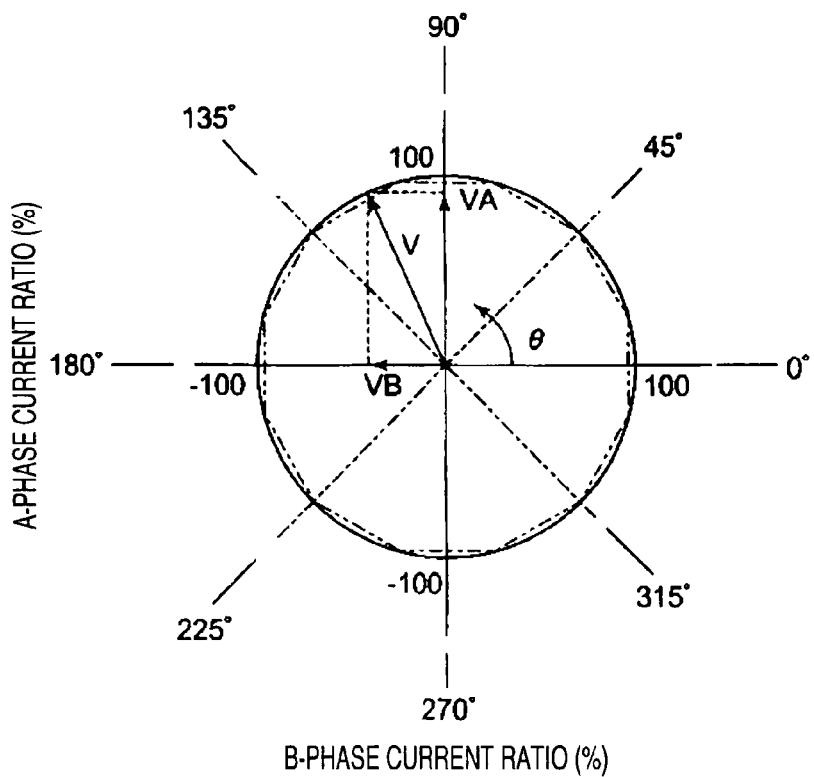

FIG. 5 is a diagram schematically illustrating the structure of main parts of the PF motor 5 shown in FIG. 3. FIG. 6 is a circuit diagram schematically illustrating the structure of the PF motor driving circuit 58 shown in FIG. 4. FIG. 7 is a diagram illustrating the step angles and stop positions of the PF motor 5 shown in FIG. 3 when the PF motor is driven in various excitation modes. FIGS. 8A and 8B are diagrams illustrating ideal waveforms of currents supplied to an A-phase driving coil 48 and a B-phase driving coil 49 shown in FIG. 6. More specifically, FIG. 8A is a diagram illustrating the ideal waveforms of currents when a vertical axis indicates a current ratio and a horizontal axis indicates an electrical angle (or step number), and FIG. 8B is a diagram illustrating the ideal waveforms of currents when the vertical axis indicates the current ratio of the A-phase driving coil 48 and the horizontal axis indicates the current ratio of the B-phase driving coil 49. FIG. 9 shows a current ratio calculation table stored in a control logic circuit 63 shown in FIG. 6.

In this embodiment, the PF motor 5 is a 2-phase stepping motor, and includes a rotor 41 having a rotating shaft 39 and a driving magnet 40 fixed to an outer circumferential surface of the rotating shaft 39, and a stator 45 having a magnetic pole set 43 having an A phase (hereinafter, referred to as an A-phase magnetic pole set 43) and a magnetic pole set 44 having a B phase (hereinafter, referred to as a B-phase magnetic pole set 44) that are arranged to have a phase difference of 90° between electrical angles.

The N pole and the S pole are alternately arranged on the outer circumferential surface of the driving magnet 40 in the circumferential direction. The driving coils 48 and 49 (see FIG. 6) are wound around the A-phase magnetic pole set 43 and the B-phase magnetic pole set 44, respectively. The driving coil 48 wound around the A-phase magnetic pole set 43 is called an 'A-phase driving coil 48', and the driving coil 49 wound around the B-phase magnetic pole set 44 is called a 'B-phase driving coil 49'.

As shown in FIG. 5, in this embodiment, the A-phase magnetic pole set 43 includes 24 A-phase magnetic poles 46 that are arranged at mechanical angle pitches of 15°. More specifically, the A-phase magnetic pole set 43 includes A+-phase magnetic poles 46a and A--phase magnetic poles 46b that are alternately arranged at mechanical angle pitches of 15° (electrical angle pitches of 180°). The A+-phase magnetic poles 46a and the A--phase magnetic poles 46b are magnetized with opposite polarities when a current is supplied to the A-phase driving coil 48. For example, when a current is supplied to the A-phase driving coil 48 in a predetermined direction, the A+-phase magnetic poles 46a are magnetized with the N pole, and the A--phase magnetic poles 46b are magnetized with the S pole. When the current is supplied to the A-phase driving coil 48 in the opposite direction, the A+-phase magnetic poles 46a are magnetized with the S pole, and the A--phase magnetic poles 46b are magnetized with the N pole.

Similarly, the B-phase magnetic pole set 44 includes 24 B-phase magnetic poles 47 that are arranged at mechanical angle pitches of 15°. More specifically, the B-phase magnetic pole set 44 includes B+-phase magnetic poles 47a and B--phase magnetic poles 47b that are alternately arranged at mechanical angle pitches of 15° (electrical angle pitches of 180°). Similar to the A+-phase magnetic poles 46a and the A--phase magnetic poles 46b, the B+-phase magnetic poles 47a and the B--phase magnetic poles 47b are magnetized with opposite polarities when a current is supplied to the B-phase driving coil 49.

The A-phase magnetic poles 46 and the B-phase magnetic poles 47 are alternately arranged at mechanical angle pitches of 7.5° (electrical angle pitches of 90°). For example, as shown in FIG. 5, the A+-phase magnetic pole 46a, the B+-phase magnetic pole 47a, the A--phase magnetic pole 46b, and the B--phase magnetic pole 47b are arranged in the clockwise direction in this order. FIG. 7 shows the relationship among the electrical angles of the A+-phase magnetic pole 46a, the B+-phase magnetic pole 47a, the A--phase magnetic pole 46b, and the B--phase magnetic pole 47b. That is, the A+-phase magnetic pole 46a, the B+-phase magnetic pole 47a, the A--phase magnetic pole 46b, and the B--phase magnetic pole 47b are arranged in this order at electrical angle pitches of 90°.

In the following description, as shown in FIG. 7, it is assumed that the B+-phase magnetic pole 47a is arranged at a position having an electrical angle of 0°, the A+-phase magnetic pole 46a is arranged at a position having an electrical angle of 90°, the B--phase magnetic pole 47b is arranged at a position having an electrical angle of 180°, and the A--phase magnetic pole 46b is arranged at a position having an electrical angle of 270°. Further, in the following description, a position at an electrical angle of 45° shown in FIG. 7 is referred to as a reference position. As described later, a step at the reference position is referred to as a step 0.

The PF motor 5 according to this embodiment can be driven in the following four excitation modes: a 2-phase excitation mode in which the amount and direction of current supplied to the A-phase driving coil 48 and the B-phase driving coil 49 are changed to rotate the rotor 41 in four steps at an electrical angle of 360° (that is, theoretically, the rotor 41 is rotated at a step angel of 90°, which is an electrical angle); a 1-2-phase excitation mode in which the rotor 41 is rotated in 8 steps at an electrical angle of 360° (that is, theoretically, the rotor 41 is rotated at a step angel of 45°, which is an electrical angle); a W1-2-phase excitation mode in which the rotor 41 is rotated in 16 steps at an electrical angle of 360° (that is, theoretically, the rotor 41 is rotated at a step angel of 22.5°, which is an electrical angle); and a 2W1-2-phase excitation mode in which the rotor 41 is rotated in 32 steps at an electrical angle of 360° (that is, theoretically, the rotor 41 is rotated at a step angel of 11.25°, which is an electrical angle). In addition, the PF motor 5 according to this embodiment may be driven in a 4W1-2-phase excitation mode in which the rotor 41 is rotated in 64 steps at an electrical angle of 360° (that is, theoretically, the rotor 41 is rotated at a step angel of 5.625°, which is an electrical angle).

As described above, the PF motor 5 can be driven in the four excitation modes. However, in this embodiment, the PF motor 5 is driven in three modes, that is, the 2-phase excitation mode, the 1-2-phase excitation mode, and the W1-2-phase excitation mode. In addition, in the following description, as shown in FIG. 7, it is assumed that, when the PF motor 5 is driven in the 2-phase excitation mode, the stop position of the rotor 41 is referred to as a first stop position 71, when the PF motor 5 is driven in the 1-2-phase excitation mode, the stop position of the rotor 41 other than the first stop position 71 (that is, the stop position of the rotor 41 when the PF motor 5 is driven in a one-phase excitation mode) is referred to as a second stop position 72, when the PF motor 5 is driven in the W1-2-phase excitation mode, the stop position of the rotor 41 other than the first and second stop positions 71 and 72 is referred to as a third stop position 73, when the PF motor 5 is driven in the 2W1-2-phase excitation mode, the stop position of the rotor 41 other than the first to third stop positions 71 to 73 is referred to as a fourth stop position 74, and when the PF motor 5 is driven in the 4W1-2-phase excitation mode, the stop position of the rotor 41 other than the first to fourth stop positions 71 to 74 is referred to as a fifth stop position 75.

In general, in the 2-phase stepping motor, from the viewpoint of characteristics thereof, when a current is supplied to the driving coil, a maximum position holding torque is obtained at the stop positions in the 2-phase excitation mode. Therefore, when a current is supplied to the driving coil, the rotor is in a stable state at the stop position in the 2-phase excitation mode. That is, in this embodiment, the first stop position 71 of the rotor 41 is a stable stop position, and stop positions other than the first stop position 71, that is, the second to fifth stop positions 72 to 75 are unstable stop positions. In addition, detent torque (residual torque) has a maximum value at the second stop position 72.

As shown in FIG. 6, the PF motor driving circuit 58 includes an A-phase current control circuit 61 for controlling the current supplied to the A-phase driving coil 48, a B-phase current control circuit 62 for controlling the current supplied to the B-phase driving coil 49, and a control logic circuit 63 to which a control instruction, which is a digital signal output from the ASIC 56.

As shown in FIG. 6, each of the A-phase current control circuit 61 and the B-phase current control circuit 62 is a so-called full-bridge circuit using four transistors 64. A base terminal of each of the transistors 64 is connected to the control logic circuit 63. The A-phase current control circuit 61 and the B-phase current control circuit 62 control the amount and direction of currents supplied to the A-phase driving coil 48 and the B-coil driving coil 49 on the basis of signals input to the base terminals of the transistors 64 from the control logic circuit 63, respectively.

More specifically, assuming that the rotor 41 rotates a very small step angle (that is, in an infinite step number), as shown in FIG. 8A, theoretically, a sine-wave current C1 is supplied to the A-phase driving coil 48, and a sine-wave current C2 having a phase difference of 90° in electrical angle from the current C1 is supplied to the B-phase driving coil 49. That is, assuming that the driving conditions of the PF motor 5, such as the rotational speed, are fixed, as shown in FIG. 8B, theoretically, the currents C1 and C2 are supplied to the A-phase driving coil 48 and B-phase driving coil 49, respectively, such that the magnitude of a resultant vector V of a vector $V_A$ of the current C1 supplied to the A-phase driving coil 48 and a vector $V_B$ of the current C2 supplied to the B-phase driving coil 49 (that is, the radius of a circle shown in FIG. 8B) does not vary. However, in this embodiment, actually, as represented by a two-dot chain line in FIG. 8B, currents are supplied to the A-phase driving coil 48 and the B-phase driving coil 49 such that, for example, a dodecagon is formed by the resultant vector V (that is, the magnitude of the resultant vector V is little changed by the electrical angle). The magnitude of the resultant vector V is changed according to the driving conditions of the PF motor 5, such as the rotational speed.

In FIG. 8A, the polarities of the currents C1 and C2 indicate the directions thereof. When the polarities of the currents C1 and C2 are changed, the directions of the currents C1 and C2 respectively supplied to the A-phase driving coil 48 and the B-phase driving coil 49 are changed. The electrical angles shown in FIG. 8A correspond to the electrical angles shown in the outer circumferential side of the circle formed by the resultant vector V shown in FIG. 8B.

The control logic circuit 63 generates analog signals on the basis of the digital signals input from the ASIC 56, and outputs signals for controlling the amount and direction of currents supplied to the -phase driving coil 48 and the B-phase driving coil 49 to the base terminal of each of the transistors 64.

A digital signal corresponding to the sum of the current C1 and the current C2 (that is, the magnitude of the resultant vector V shown in FIG. 8B) is input to the control logic circuit 63. That is, data related to the sum of the current C1 and the current C2 is stored in the ROM 53, and a digital signal corresponding to the data related to the sum of currents read from the ROM 53 is input from the ASIC 56 to the control logic circuit 63 according to the rotational speed of the PF motor 5. In this embodiment, when the driving conditions of the PF motor 5, such as the rotational speed, are fixed, a digital signal is input to the control logic circuit 63 such that the sum of the current C1 and the current C2 (that is, the magnitude of the resultant vector V) is changed by the step number (or the electrical angle) as shown in the two-dot chain line in FIG. 8B.

Further, digital signals corresponding to the ratio of the current C1 to the sum of the currents C1 and C2 and the ratio of the current C2 to the sum of the currents C1 and C2 are input to the control logic circuit 63. That is, data related to the ratios of the currents C1 and C2 is stored in the ROM 53, and digital signals corresponding to the data related to the ratios of the currents C1 and C2 read from the ROM 53 are input from the ASIC 56 to the control logic circuit 63 according to the excitation mode of the PF motor 5.

More specifically, as shown in FIG. 9, an angle data signal, which is a 4-bit digital signal, and a code data signal, which is a 1-bit digital signal, are input to the control logic circuit 63 as digital signals corresponding to the ratios of the currents C1 and C2. In addition, the current ratio calculation table shown in FIG. 9 is stored in the control logic circuit 63. The control logic circuit 63 uses the current ratio calculation table to calculate the ratio of the current C1 to the sum of the currents C1 and C2 and the ratio of the current C2 to the sum of the currents C1 and C2 on the basis of the input angle data signal and code data signal.

As described above, in this embodiment, the PF motor 5 can be driven in the 4W1-2-phase excitation mode by predetermined setting. Therefore, as shown in FIG. 9, the ratios of the current C1 and the ratios of the current C2 corresponding to 64 steps in the 4W1-2-phase excitation mode are set into the current ratio calculation table. That is, in one step on the current ratio calculation table shown in FIG. 9, theoretically, the rotor 41 rotates at an electrical angle of 5.625°. As shown in FIG. 9, it is possible to specify the electrical angle of the rotor 41 on the basis of the angle data signal and the code data signal input to the control logic circuit 63. The electrical angles written the table shown in FIG. 9 correspond to the electrical angles shown in FIG. 7. As described above, the position at an angle of 45° in FIG. 7 is a reference position of the electrical angle, and the step at the reference position is step No. 0. In addition, as shown in FIG. 9, the step at a position having an electrical angle of 39.375° is step No. 1. Similarly, the steps at the positions having the electrical angles shown in FIG. 9 are step Nos. 2, 3, . . . , 63.

As such, a digital signal corresponding to the sum of the current C1 and the current C2 and digital signals corresponding to the ratio of the current C1 and the ratio of the current C2 to the sum are input to the control logic circuit 63. The control logic circuit 63 specifies the magnitude and direction of the currents C1 and C2 on the basis of the sum of the currents C1 and C2, the ratio of the current C1 to the sum, and the ratio of the current C2 to the sum, and outputs predetermined signals to the base terminals of the transistors 64 such that the specified currents C1 and C2 are supplied to the A-phase driving coil 48 and the B-phase driving coil 49, respectively.

The PF motor 5 is driven in the 2-phase excitation mode or the 1-2-phase excitation mode on the basis of digital signals (specifically, the angle data signal and the code data signal) corresponding to the ratios of the input currents C1 and C2. That is, when a signal (specifically, the angle data signal and the code data signal) in a step No. M1 (M1 is an integer in the range of 0 to 63) shown in FIG. 9 is signal No. M1, four types of signals, such as signal No. 0, signal No. 16, signal No. 32, and signal No. 48, are sequentially input to the control logic circuit 63 in this order in the 2-phase excitation mode. In the 1-2-phase excitation mode, eight types of signals, such as signal No. 0, signal No. 8, signal No. 16, signal No. 24, signal No. 32, signal No. 40, signal No. 48, and signal No. 56, are sequentially input to the control logic circuit 63 in this order. Similarly, in the W1-2-phase excitation mode, sixteen types of signals are sequentially input to the control logic circuit 63. In the 2W1-2-phase excitation mode, thirty-two types of signals are sequentially input to the control logic circuit 63. In the 4W1-2-phase excitation mode, sixty-four types of signals are sequentially input to the control logic circuit 63.

[Control Method of PF Motor]

Hereinafter, methods of controlling the acceleration, start, deceleration, stop of the PF motor 5 will be sequentially described below.

[Acceleration Control of PF Motor]

Figure 11:
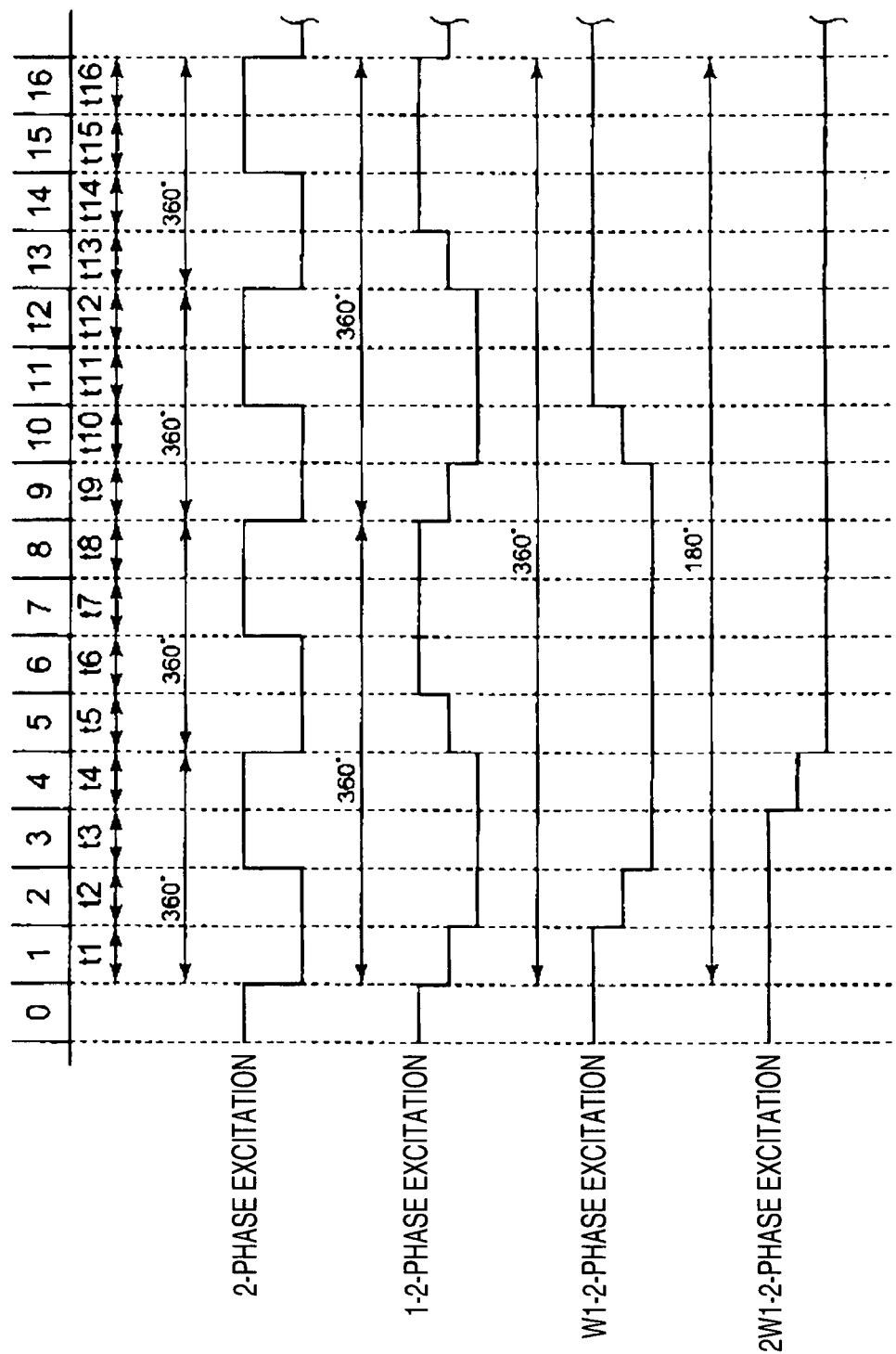
FIG. 11 is a diagram illustrating an acceleration control process of the PF motor shown in FIG. 3.

FIG. 10 is a diagram illustrating a table having acceleration data of the PF motor 5 stored in the ROM 53 shown in FIG. 4. FIG. 11 is a diagram illustrating the acceleration control of the PF motor 5 shown in FIG. 3.

In this embodiment, an acceleration table of the PF motor 5 shown in FIG. 10 is stored in the ROM 53. when the PF motor 5 is accelerated, a digital signal corresponding to the sum of the current C1 and the current C2 and digital signals corresponding to the ratio of the current C1 and the ratio of the current C2 to the sum are output from the ASIC 56 on the basis of acceleration time data set into the acceleration table. Then, the current C1 supplied to the A-phase driving coil 48 and the current C2 supplied to the B-phase driving coil 49 are controlled so that the rotor 41 is accelerated. In addition, in this embodiment, as described above, the PF motor 5 can be driven in four excitation modes, such as the 2-phase excitation mode, the 1-2-phase excitation mode, the W1-2-phase excitation mode, and the 2W1-2-phase excitation mode. A common (the same) acceleration table shown in FIG. 10 is used for all the excitation modes. Hereinafter, the acceleration control of the PF motor 5 for accelerating the rotor 41 will be described below.

As described above, the digital signal corresponding to the sum of the current C1 and the current C2 and digital signals corresponding to the ratio of the current C1 and the ratio of the current C2 to the sum are output from the ASIC 56 to the control logic circuit 63 on the basis of the acceleration time data set into the acceleration table shown in FIG. 10. However, in the following description, for simplicity of explanation, it is assumed that only the digital signals corresponding to the ratio of the current C1 and the ratio of the current C2 to the sum thereof are input to the control logic circuit 63.

For example, when the PF motor 5 is driven in the 2-phase excitation mode, as described above, four types of signals, such as signal No. 0, signal No. 16, signal No. 32, and signal No. 48, are input to the control logic circuit 63 as the digital signals corresponding to the ratio of the current C1 and the ratio of the current C2 to the sum thereof. The four types of signals are input on the basis of the acceleration time data shown in FIG. 10. For example, when the rotor 41 is accelerated from a position at an electrical angle of 450 (that is, a position in step No. 0), which is the reference position, on the basis of the acceleration time data shown in FIG. 10, in the 2-phase excitation mode, first, the signal No. 16 is input, and the time from the input of the signal No. 16 to the input of the signal No. 32 is a time corresponding to acceleration time data No. 1, that is, 1818 µs. In addition, the time from the input of the signal No. 32 to the input of the signal No. 48 is a time corresponding to acceleration time data No. 2 shown in FIG. 10, that is, 1348 µs. Similarly, when a time corresponding to acceleration time data No. M2 (M2 is an integer equal to or greater than 1 (in FIG. 10, an integer in the range of 1 to 32)) is 'tM2', in the 2-phase excitation mode, as shown in FIG. 11, the rotor 41 rotates at an electrical angle of 360° during the period from a time t1 to a time t4.

FIG. 11 is a diagram schematically illustrating the state of current supplied to the A-phase driving coil 48. In FIG. 11, a high level corresponds to the positive state shown in FIG. 8A, and a low level corresponds to the negative state shown in FIG. 8A. In addition, an intermediate level between the high level and the low level indicates that no current is supplied to the A-phase driving coil 48. In FIG. 11, intervals of the time tM2 are equal to each other. However, actually, since the time is gradually shortened, the intervals of the time tM2 are sequentially shortened.

For example, when the PF motor 5 is driven in the 1-2-phase excitation mode, the eight types of signals are input as digital signals corresponding to the electrical angles of the currents C1 and C2. The eight types of signals are input on the basis of the acceleration time data shown in FIG. 10. For example, when the rotor 41 is accelerated from the position at an electrical angle of 45° (the reference position) on the basis of the acceleration time data shown in FIG. 10, in the 1-2-phase excitation mode, first, the signal No. 8 is input, and the time from the input of the signal No. 8 to the input of the signal No. 16 is a time t1. In addition, the time from the input of the signal No. 16 to the input of the signal No. 24 is a time t2. Similarly, in the 1-2-phase excitation mode, as shown in FIG. 11, the rotor 41 rotates at an electrical angle of 360° during the period from the time t1 to a time t8.

For example, when the PF motor 5 is driven in the W1-2-phase excitation mode, sixteen types of signals, such as signal No. 4, signal No. 12, signal No. 20, signal No. 28, signal No. 36, signal No. 44, signal No. 52, and signal No. 60 in addition to the eight types of signals input in the 1-2-phase excitation mode, are input as digital signals corresponding to the electrical angles of the currents C1 and C2. The sixteen types of signals are input on the basis of the acceleration time data shown in FIG. 10. For example, when the rotor 41 is accelerated from the position at an electrical angle of 45° (the reference position) on the basis of the acceleration time data shown in FIG. 10, in the W1-2-phase excitation mode, first, the signal No. 4 is input, and the time from the input of the signal No. 4 to the input of the signal No. 8 is a time t1. In addition, the time from the input of the signal No. 8 to the input of the signal No. 12 is a time t2. Similarly, in the W1-2-phase excitation mode, as shown in FIG. 11, the rotor 41 rotates at an electrical angle of 360° during the period from the time t1 to a time t16.

For example, when the PF motor 5 is driven in the 2W1-2-phase excitation mode, thirty-two types of signals, such as signal No. 2, signal No. 6, signal No. 10, signal No. 14, signal No. 18, signal No. 22, signal No. 26, signal No. 30, signal No. 34, signal No. 38, signal No. 42, signal No. 46, signal No. 50, signal No. 54, signal No. 58, and signal No. 62 in addition to the sixteen types of signals input in the W1-2-phase excitation mode, are input as digital signals corresponding to the electrical angles of the currents C1 and C2. The thirty-two types of signals are input on the basis of the acceleration time data shown in FIG. 10. For example, when the rotor 41 is accelerated from the position at an electrical angle of 45° (the reference position) on the basis of the acceleration time data shown in FIG. 10, in the 2W1-2-phase excitation mode, first, the signal No. 2 is input, and the time from the input of the signal No. 2 to the input of the signal No. 4 is a time t1. In addition, the time from the input of the signal No. 4 to the input of the signal No. 6 is a time t2. Similarly, in the 2W1-2-phase excitation mode, as shown in FIG. 11, the rotor 41 rotates at an electrical angle of 360° during the period from the time t1 to a time t32. That is, the rotor 41 rotates at an electrical angle of 180° during the period from the time t1 to the time t16.

For example, when the acceleration time required for the PF motor 5 to make a first revolution at an electrical angle of 360° in the 2-phase excitation mode on the basis of the acceleration time data shown in FIG. 10 is referred to as 1, the acceleration time required for the PF motor 5 to rotate in the 1-2-phase mode is about 1.6, the acceleration time required for the PF motor 5 to rotate in the W1-2-phase mode is about 2.4, and the acceleration time required for the PF motor 5 to rotate in the 2W1-2-phase mode is about 3.6. That is, when the PF motor 5 rotates in the 2-phase excitation mode on the basis of the acceleration time data shown in FIG. 10 at the time of acceleration, the PF motor 5 has the maximum average acceleration. When the PF motor 5 rotates in the 2W1-2-phase excitation mode, the PF motor 5 has the minimum average acceleration.

In uniform speed control in which the PF motor 5 is accelerated on the basis of the acceleration time data shown in FIG. 10 and then the rotor 41 rotates in a predetermined rotational speed, in the 2-phase excitation mode, four types of signals, such as signal No. 0, signal No. 16, signal No. 32, and signal No. 48, are sequentially input at regular intervals tc, and in the 1-2-phase excitation mode, eight types of signals, such as signal No. 0, signal No. 8, signal No. 16, signal No. 24, signal No. 32, signal No. 40, signal No. 48, and signal No. 56, are sequentially input at regular intervals tc. In addition, in the uniform speed control, in the W1-2-phase excitation mode, the sixteen types of signals are sequentially input at regular intervals tc, and in the 2W1-2-phase excitation mode, the thirty-two types of signals are sequentially input at regular intervals tc. That is, in the uniform speed control, when the rotational speed of the PF motor in the 2-phase excitation mode is 1, the rotational speed of the PF motor in the 1-2-phase excitation mode is ½, the rotational speed of the PF motor in the W1-2-phase excitation mode is ¼, and the rotational speed of the PF motor in the 2W1-2-phase excitation mode is ⅛.

(Start Control of PF Motor)

Figure 14A:
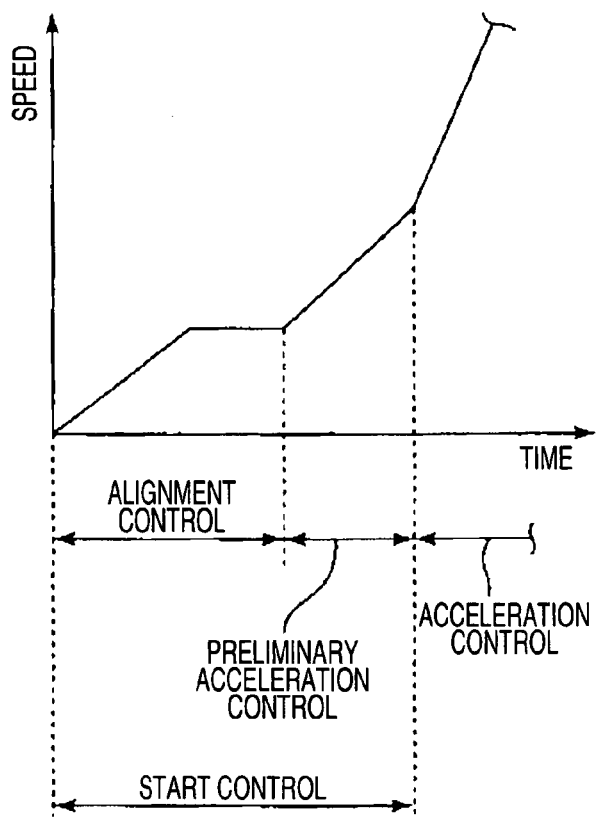
FIGS. 14A and 14B are diagrams illustrating the relationship between an alignment control process and the acceleration control process of the PF motor shown in FIG. 3.
Figure 14B:
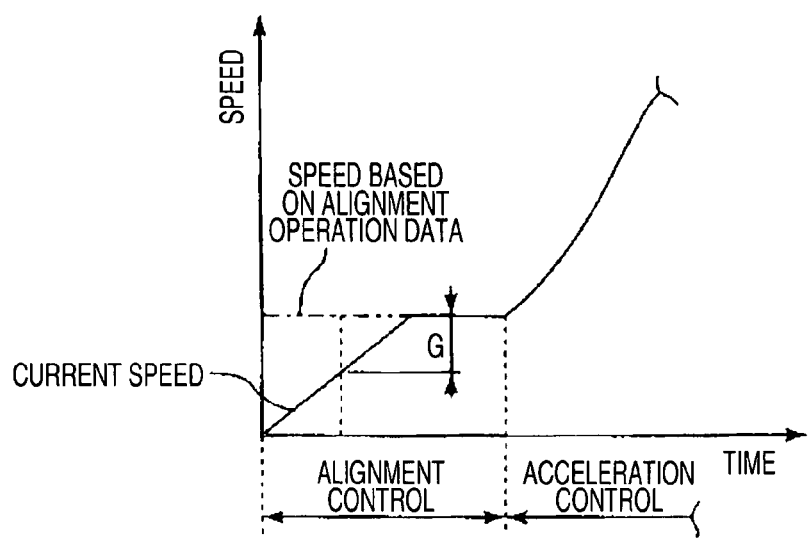

FIG. 12 is a diagram illustrating a positional operation table of the PF motor 5 stored in the ROM 53 shown in FIG. 4. FIG. 13 is a diagram illustrating a preliminary acceleration table of the PF motor 5 stored in the ROM 53 shown in FIG. 4. FIGS. 14A and 14B are diagrams illustrating the relationship between the positioning control and the speed control of the PF motor 5 shown in FIG. 3. More specifically, FIG. 14A is a diagram illustrating the relationship between positioning control and the acceleration control according to the embodiment of the invention, and FIG. 14B is a diagram illustrating the relationship between the positioning control and the acceleration control when there is no preliminary acceleration control.

As described above, in the acceleration control according to this embodiment, a common acceleration table (that is, common acceleration time data) is used for the 2-phase excitation mode, the 1-2-phase excitation mode, the W1-2-phase excitation mode, and the 2W1-2-phase excitation mode. Therefore, in this embodiment, as described above, the rotor 41 has different average accelerations in the excitation modes. That is, in the 2-phase excitation mode having a large electrical angle, the average acceleration of the rotor 41 is high, but in the 2W1-2-phase excitation mode having a small electrical angle, the average acceleration of the rotor 41 is low. Therefore, in a case in which the rotor 41 is accelerated on the basis of the common acceleration time data immediately after the PF motor 5 starts, for example, in the 2W1-2-phase excitation mode, if acceleration time data corresponding to a certain step from the start of the PF motor 5 is set to be matched with a small step angle (theoretically, at an electrical angle of 11.25°) in the 2W1-2-phase excitation mode such that the rotor 41 is appropriately accelerated immediately after it starts in the 2W1-2-phase excitation mode, the rotor 41 rotates at a large step angle (theoretically, at an electrical angle of 90°) on the basis of the acceleration time data when the rotor 41 is accelerated in the 2-phase excitation mode. As a result, the rotor 41 is suddenly accelerated. Meanwhile, if acceleration time data corresponding to a certain step from the start of the PF motor 5 is set to be matched with a large step angle in the 2-phase excitation mode such that the rotor 41 is appropriately accelerated immediately after it starts in the 2-phase excitation mode, the rotor 41 rotates at a small step angle on the basis of the acceleration time data when the rotor 41 is accelerated in the 2W1-2-phase excitation mode. As a result, the rotor 41 rotates at a very low speed at the time of acceleration, and it takes much time to accelerate the rotor 41.

Therefore, in this embodiment, in order to solve the above-mentioned problems, a start control process of starting the rotor 41 on the basis of start operation data set for the four excitation modes is performed before the acceleration control. More specifically, an alignment control process of aligning the rotor 41 and a start control process, called a preliminary acceleration control process of preliminarily accelerating the rotor 41 after the alignment control process, are performed. In this embodiment, alignment operation data and preliminary acceleration data, which will be described later, are used as the start operation data. Next, first, the alignment control process will be described below.

In general, from the viewpoint of the characteristics of the 2-phase stepping motor, when the 2-phase stepping motor starts from the stop position of the rotor to rotate in the 2-phase excitation mode, it can perform the most stable acceleration. That is, in this embodiment, when the PF motor 5 starts from the first stop position 71 (see FIG. 7), the rotor 41 performs the most stable acceleration. Meanwhile, as described above, in this embodiment, since the PF motor 5 can be driven in the four excitation modes, such as the 2-phase excitation mode, the 1-2-phase excitation mode, the W1-2-phase excitation mode, and the 2W1-2-phase excitation mode, the stop position of the rotor 41 is not necessarily limited to the first stop position 71. For example, when the PF motor 5 is driven in the 2W1-2-phase excitation mode, the stop position of the rotor 41 is any one of the first stop position 71 to the fourth stop position 74. When the stop position of the rotor 41 is any one of the second stop position 72 to the fourth stop position 74, the acceleration of the rotor 41 is not stabilized.

In addition, from the viewpoint of the characteristics of the stepping motor, start torques are different from each other at the first stop position 71 to the fourth stop position 74. Therefore, it is necessary to change the sum of the current C1 and the current C2 at the time of acceleration according to the stop positions in order to accelerate the rotor 41 to a predetermined rotational speed in a constant step number regardless of the excitation mode of the PF motor 5 and the stop position of the rotor 41. In addition, it is necessary to change the step number until acceleration is completed according to the stop positions in order to accelerate the rotor 41 to a predetermined rotational speed with the sum of the current C1 and the current C2 regardless of the excitation mode of the PF motor 5 and the stop position of the rotor 41. As a result, the start control process becomes complicated.

In this embodiment, in the start control process, the alignment control process of rotating the rotor 41 to the first stop position 71 to align the rotational position of the rotor 41 is performed. In this embodiment, an alignment operation table shown in FIG. 12 is stored in the ROM 53, and the alignment control process is performed on the basis of alignment operation time data (hereinafter, referred to as alignment operation data) of the alignment operation table.

As described above, in this embodiment, the PF motor 5 can be driven in the four excitation modes, such as the 2-phase excitation mode, the 1-2-phase excitation mode, the W1-2-phase excitation mode, and the 2W1-2-phase excitation mode. The alignment control process is performed at a step angle in the 2W1-2-phase excitation mode having the smallest step angle among the four excitation modes such that the rotor 41 is rotated to the first position 71 to perform alignment regardless of the excitation mode before stop. That is, in the alignment control process, theoretically, the rotor 41 is rotated at a step angle of 11.25°, which is an electrical angle.

As shown in FIG. 12, alignment operation data corresponding to eight steps in the 2W1-2-phase excitation mode are set on the alignment operation table. This is because, since the step angle in the 2W1-2-phase excitation mode is theoretically 11.25° in electrical angle, it is possible to locate the rotor 41 to the first stop position 71 in up to eight steps even when the rotor 41 is located at any one of the first stop position 71 to the fourth stop position 74. When the PF motor is in the 2-phase excitation mode before stop, the rotor 41 stops at only the first stop position 71. Even when the PF motor is in the excitation modes other than the 2-phase excitation mode before stop, the rotor 41 may stop at the first stop position 71. Therefore, when the rotor 41 stops at the first stop position 71, it is not necessary to perform the alignment control process, and it is possible to use alignment operation data corresponding to seven steps on the alignment operation table. However, in this embodiment, even when the rotor stops at the first stop position, the alignment control process is performed. In this way, it is unnecessary to determine whether to perform the alignment control process according to whether the rotor stops at the first stop position 71, which results in a simple control process.

In order to solve the problems when the rotor 41 is accelerated immediately after start, as shown in FIG. 12, alignment operation data for every excitation mode used for the driving of the PF motor 5 is set on the alignment operation table. In this embodiment, in the same excitation mode, the same alignment operation data is used regardless of the step number. That is, in the alignment control process, signals for rotating the rotor 41 at a uniform speed are input to the control logic circuit 63.

The alignment control process ends when the position of the rotor 41 is aligned with the first stop position 71. Therefore, in the alignment control process, the step number varies from 1 to 8 according to the stop position of the rotor 41. For example, when the rotor 41 is at the fourth stop position 74 immediately before the first stop position 71 in the direction in which the rotor 41 rotates, the step number is 1. When the rotor 41 is at the first stop position 71, the step number in the alignment control process is 8.

As described above, in the alignment control process, alignment is performed by using the step angle in the 2W1-2-phase excitation mode. Therefore, for example, when the rotor 41 stops at a position at an electrical angle of 45°, which is the reference position, signal No. 2, signal No. 4, signal No. 6, and so on are sequentially input to the control logic circuit 63 on the basis of the alignment operation data (specifically, time intervals set on the alignment operation table). The stop position of the rotor 41 is stored in the non-volatile memory 55 on the basis of, for example, the result of calculation in the CPU 52, and signals corresponding to a necessary step number is input to the control logic circuit 63, on the basis of the stored data, to perform the alignment control process.

As described above, in the alignment control process, the step number varies from 1 to 8 according to the stop position of the rotor 41. Therefore, when the step number is small in the alignment control process (for example, the step number is 1 or 2), the rotational speed of the rotor 41 does not follow the signals input to the control logic circuit 63. For example, as shown in FIG. 14B, when the step number is small, a difference G occurs between the rotational speed of the rotor 41 based on the alignment control table and the actual rotational speed of the rotor 41. Therefore, when the alignment control process is directly switched to the acceleration control process based on the acceleration table shown in FIG. 10, a large variation in the rotational speed of the rotor 41 corresponding to the difference G occurs.

In the start control process according to this embodiment, as shown in FIG. 14A, a preliminary acceleration process of preliminarily accelerating the rotor 41 before the acceleration control process is performed in order to prevent the large variation in the rotational speed of the rotor 41. In this embodiment, a preliminary acceleration table shown in FIG. 13 is stored in the ROM 53, and the preliminary acceleration control process is performed on the basis of preliminary acceleration time data (hereinafter, referred to as preliminary acceleration data) of the preliminary acceleration table. Hereinafter, the preliminary acceleration control process of preliminary accelerating the rotor 41 of the PF motor 5 will be described below.

As described above, from the viewpoint of the characteristics of the 2-phase stepping motor, when the 2-phase stepping motor starts from the stop position of the rotor to rotate in the 2-phase excitation mode, it can perform the most stable acceleration. Therefore, in the preliminary acceleration control process, the rotor 41 is preliminarily accelerated from the first stop position 71 aligned by the alignment control process to a position corresponding the next first stop position 71 in the direction in which the rotor 41 rotates in order for stable acceleration. That is, in the preliminary acceleration control process, the rotor 41 is preliminarily accelerated from the first stop position 71 aligned by the position alignment control process by an electrical angle of 90°, and the preliminary acceleration control process is switched to the acceleration control process at the first stop position 71 where the preliminary acceleration is completed. Similar to the alignment control process, in the preliminary acceleration control process, the rotor 41 is driven in the 2W1-2-phase excitation mode such that the preliminary acceleration of the rotor 41 is smoothly performed at the electrical angle of 90°. As shown in FIG. 13, preliminary acceleration data corresponding to eight steps in the 2W1-2-phase excitation mode are set on the preliminary acceleration table.

As shown in FIG. 13, preliminary acceleration data for every excitation mode used for driving the PF motor 5 are set on the preliminary acceleration table according to this embodiment in order to solve the problems caused when the rotor 41 is accelerated immediately after start, to smoothly switch a control process from the preliminary acceleration control process to the acceleration control process, and to smoothly switch a control process from the alignment control process to the preliminary acceleration control process.

Similar to the alignment control process, in the preliminary acceleration control process, the rotor 41 is preliminarily accelerated at the step angle in the 2W1-2-phase excitation mode. Therefore, when the rotor 41 is located at the first stop position 71 corresponding to a position at an electrical angle of 45°, which is the reference position, eight signals, that is, signal No. 2, signal No. 4, . . . , signal No. 16, are sequentially input to the control logic circuit 63 on the basis of the preliminary acceleration data (specifically, time intervals set on the preliminary acceleration table).

For example, signals for rotating the rotor 41 (that is, a signal corresponding to the sum of the current C1 and C2 and signals corresponding to the ratio of the current C1 and the ratio of the current C2 to the sum) are input to the control logic circuit 63 on the basis of the preliminary acceleration data of the eighth step on the preliminary acceleration table shown in FIG. 13, and then signals for rotating the rotor 41 are input to the control logic circuit 63 on the basis of acceleration time data No. 1 of the acceleration table shown in FIG. 10. That is, when the rotor 41 is rotated from the first stop position 71 aligned by the alignment control process to the next first stop position 71 in the direction in which the rotor 41 is rotated, the preliminary acceleration control process is switched to the acceleration control process.

(Deceleration Control of PF Motor)

FIG. 15 is a diagram illustrating a deceleration table of the PF motor 5 stored in the ROM 53 shown in FIG. 4.

In this embodiment, the deceleration table of the PF motor 5 shown in FIG. 15 is stored in the ROM 53. Similar to acceleration, when the PF motor 5 is decelerated, a digital signal corresponding to the sum of the current C1 and the current C2 and digital signals corresponding to the ratio of the current C1 and the ratio of the current C2 to the sum are output from the ASIC 56 on the basis of deceleration time data set on the acceleration table. In addition, similar to the acceleration control process, in this embodiment, the same deceleration table is used for the 2-phase excitation mode, the 1-2-phase excitation mode, the W1-2-phase excitation mode, and the 2W1-2-phase excitation mode.

For example, during the driving of the PF motor 5 in the 2-phase excitation mode, when the rotor 41 is decelerated from a position at an electrical angle of 45° (that is, a position in step No. 0), which is the reference position, on the basis of the deceleration time data shown in FIG. 15, first, signal No. 16 is input, and the time from the input of the signal No. 16 to the input of signal No. 32 is a time corresponding to deceleration time data No. 32 shown in FIG. 15, that is, 316 μs. In addition, the time from the input of the signal No. 32 to the input of signal No. 48 is a time corresponding to deceleration time data No. 31 shown in FIG. 15, that is, 323 μs.

For example, during the driving of the PF motor 5 in the 1-2-phase excitation mode, when the rotor 41 is decelerated from a position at an electrical angle of 45° (the reference position) on the basis of the deceleration time data shown in FIG. 15, first, signal No. 8 is input, and the time from the input of the signal No. 8 to the input of signal No. 16 is a time corresponding to deceleration time data No. 32 shown in FIG. 15. In addition, the time from the input of the signal No. 16 to the input of signal No. 24 is a time corresponding to deceleration time data No. 31 shown in FIG. 15.

For example, during the driving of the PF motor 5 in the W1-2-phase excitation mode, when the rotor 41 is decelerated from a position at an electrical angle of 45° (the reference position) on the basis of the deceleration time data shown in FIG. 15, first, signal No. 4 is input, and the time from the input of the signal No. 4 to the input of signal No. 8 is a time corresponding to deceleration time data No. 32 shown in FIG. 15. In addition, the time from the input of the signal No. 8 to the input of signal No. 12 is a time corresponding to deceleration time data No. 31 shown in FIG. 15.

For example, during the driving of the PF motor 5 in the 2W1-2-phase excitation mode, when the rotor 41 is decelerated from a position at an electrical angle of 45° (the reference position) on the basis of the deceleration time data shown in FIG. 15, first, signal No. 2 is input, and the time from the input of the signal No. 2 to the input of signal No. 4 is a time corresponding to deceleration time data No. 32 shown in FIG. 15. In addition, the time from the input of the signal No. 4 to the input of signal No. 6 is a time corresponding to deceleration time data No. 31 shown in FIG. 15.

For example, during the deceleration of the PF motor 5 based on the deceleration time data shown in FIG. 15, when the deceleration time of the PF motor 5 driven in the 2-phase excitation mode corresponding to the last electrical angle of 360° is 1, the deceleration time of the PF motor 5 driven in the 1-2-phase excitation mode is about 1.6, the deceleration time of the PF motor 5 driven in the W1-2-phase excitation mode is about 2.3, and the deceleration time of the PF motor 5 driven in the 2W1-2-phase excitation mode is about 3.3. That is, during the deceleration of the PF motor 5 based on the deceleration time data shown in FIG. 15, the PF motor 5 driven in the 2-phase excitation mode has the maximum average deceleration, and the PF motor 5 driven in the 2W1-2-phase excitation mode has the minimum average deceleration.

In this embodiment, the acceleration control process, the uniform speed control process, and the deceleration control process are performed to rotate the rotor 41 at a predetermined step angle.

(Stop Control of PF Motor)

Figure 17A:
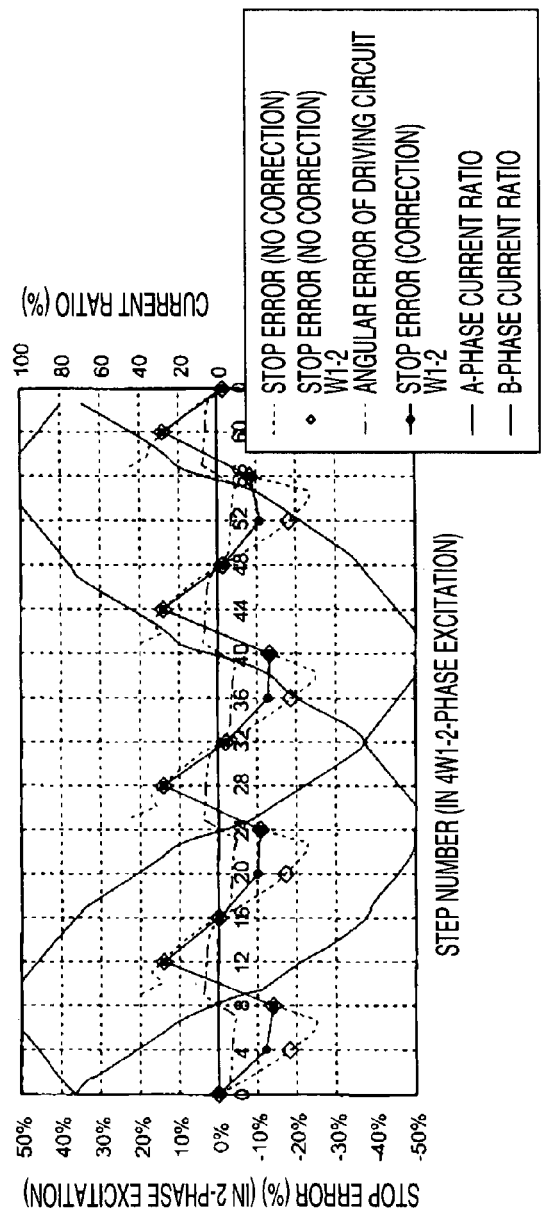
FIGS. 17A and 17B are diagrams illustrating the effects of the embodiment when the stop control process of the PF motor is performed.
Figure 17B:
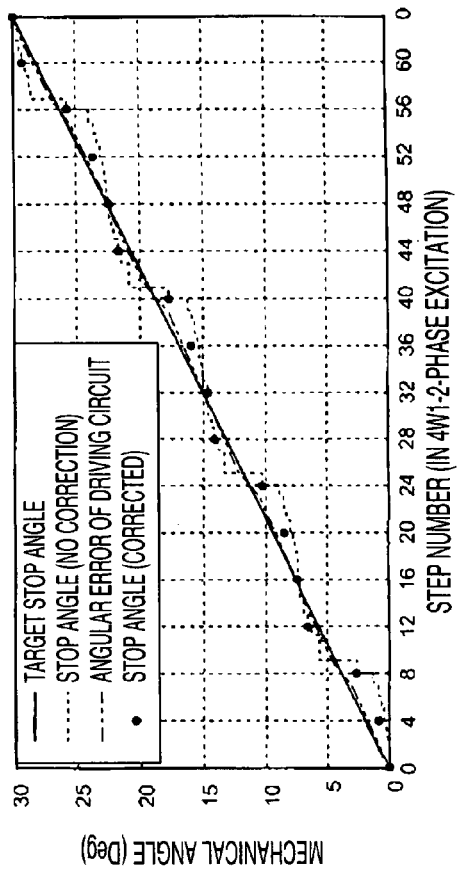
Figure 18:
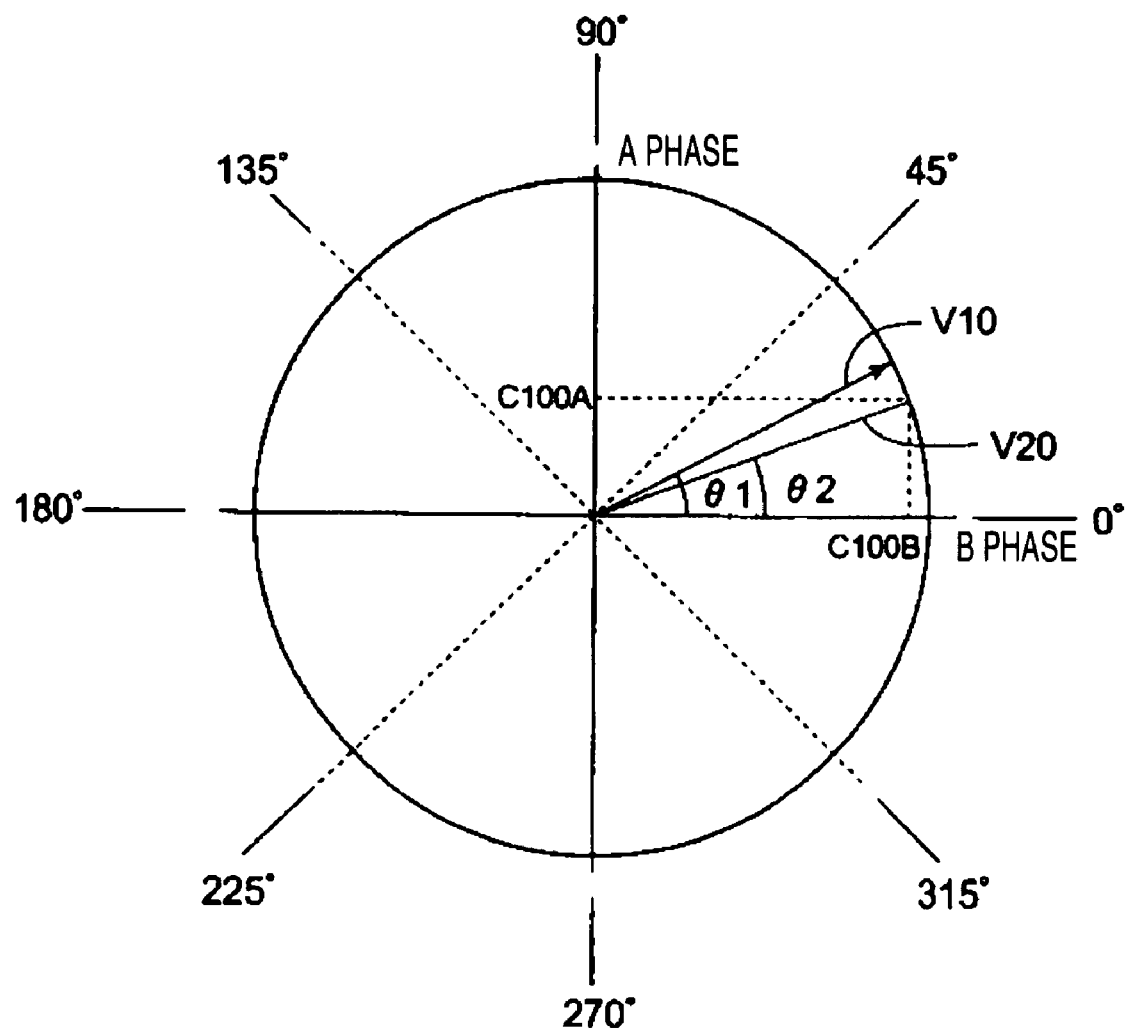
FIG. 18 is a diagram illustrating a problem to be solved by the invention.

FIG. 16 is a diagram illustrating a stop operation table of the PF motor 5 stored in the ROM 53 shown in FIG. 4. FIGS. 17A and 17B are diagrams illustrating the effects of the stop control process of the PF motor 5 according to this embodiment of the invention. More specifically, FIG. 17A is a graph illustrating a stop error for every step shown in FIG. 9 and the current ratios of the A-phase driving coil 48 and the B-phase driving coil 49, and FIG. 17B is a graph illustrating the stop angle for every step shown in FIG. 9 as the mechanical angle of the rotor 41. The step numbers indicated on the horizontal axis of FIGS. 17A and 17B is step numbers when the PF motor 5 is driven in the 4W1-2-phase excitation mode, and corresponds to the step numbers written on the current ratio calculation table shown in FIG. 9. That is, a step corresponding to an electrical angle of 45°, which is the reference position, is step No. 0. As described above, the PF motor 5 according to this embodiment has a total of 48 magnetic poles including 24 A-phase magnetic poles 46 and 24 B-phase magnetic poles 47. Therefore, when the rotor 41 rotates at an electrical angle of 360°, the rotor 41 rotates at a mechanical angle of 30°. The stop error shown in FIG. 17A is an error corresponding to a step angle in the 2-phase excitation mode (specifically, an electrical angle of 90°). For example, when the stop error is 10%, the stop angle deviates by an electrical angle of 9° (a mechanical angle of 0.75°). When the stop error shown in FIG. 17A has a negative value, the rotor 41 stops before a target stop position in the direction in which the rotor 41 rotates. On the other hand, when the stop error shown in FIG. 17A has a positive value, the rotor 41 stops after the target stop position in the direction in which the rotor 41 rotates.

Hereinafter, a stop control process of the PF motor 5 according to this embodiment will be described.

As described above, in this embodiment, a common deceleration datable (that is, common deceleration time data) is used for the 2-phase excitation mode, the 1-2-phase excitation mode, the W1-2-phase excitation mode, and the 2W1-2-phase excitation mode during deceleration. In this embodiment, when the common deceleration table to the four excitation modes is used to stop the PF motor 5, the following problems arise.

That is, as described above, in the deceleration control process, the average decelerations of the rotor in the excitation modes are different from each other. Therefore, when deceleration time data corresponding to a certain step is set before stop such that the rotor 41 set in the 2W1-2-phase excitation mode for deceleration such stops appropriately, the PF motor 5 set in the 2-phase excitation mode for deceleration stops suddenly. As a result, the stop accuracy of the rotor 41 is lowered. Meanwhile, when deceleration time data corresponding to a certain step is set before stop such that the rotor 41 set in the 2-phase excitation mode for deceleration stops appropriately, the PF motor 5 set in the 2W1-2-phase excitation mode for deceleration rotates at a very low speed to stop, and thus it takes much time to stop the rotor 41. As a result, it takes much time to transport the printing sheet P, resulting in a long printing time for the printing sheet P.

Further, in this embodiment, in order to solve the above-mentioned problems, when the PF motor 5 stops, a stop control process is performed on the basis of the stop operation table shown in FIG. 16. That is, in this embodiment, the stop operation table shown in FIG. 16 is stored in the ROM 53, and the stop control process is performed on stop operation time data (hereinafter, referred to as stop data) of the stop operation table.

In the stop control process, similar to the start control process, the rotor 41 rotates at the step angle in the 2W1-2-phase excitation mode regardless of the excitation mode of the PF motor 5 in order to simplify a control process, so that the rotor 41 can stop at any position from the first stop position 71 to the fourth stop position 74. That is, in the stop control process, theoretically, the rotor 41 rotates at a step angle of 11.25°, which is an electrical angle. In addition, stop data for every excitation mode is set on the stop operation table in order to solve the above-mentioned problems and appropriately stop the rotor 41.

In this embodiment, for example, signals for rotating the rotor 41 (that is, a signal corresponding to the sum of the current C1 and C2 and signals corresponding to the ratio of the current C1 and the ratio of the current C2 to the sum) are input to the control logic circuit 63 on the basis of deceleration data No. 1 of the deceleration table shown in FIG. 15, and then signals for rotating the rotor 41 are input to the control logic circuit 63 on the basis of stop data corresponding to a sixteenth step of the stop operation table shown in FIG. 16. That is, after signals are input to the control logic circuit 63 on the basis of the deceleration data No. 1 of the deceleration table shown in FIG. 15, the deceleration control process is switched to the stop control process.

In this embodiment, any one of signal No. 0, signal No. 16, signal No. 32, and signal No. 48 is input to the control logic circuit 63 on the basis of the deceleration data No. 1 of the deceleration table. That is, when the rotor 41 rotates to a position corresponding to the first stop position 71, the deceleration control process is switched to the stop control process.

When the process is switched to the stop control process, first, a first stop control process of decelerating the rotor 41 while rotating the rotor 41 to a position corresponding to the next stop position 71 is performed. As described above, since the rotor 41 rotates at the step angle in the 2W1-2-phase excitation mode, the rotor 41 is decelerated while being rotated by an angle corresponding to eight steps from the sixteenth step to the ninth step in the first stop control process of the stop control process.

In the first stop control process, the rotor 41 is rotated to a position corresponding to the first stop position 71, and then a second stop control process of rotating the rotor 41 at a uniform speed and finally stopping the rotor 41 is performed. In the second stop control process, signals corresponding to the step number required to stop the rotor 41 at a target stop position are input to the control logic circuit 63.

That is, when the PF motor 5 is driven in the 2-phase excitation mode, theoretically, the rotor 41 stops at the first stop position 71. Therefore, in this case, in the second stop control process, signals corresponding to eight steps from the eighth step to the first step shown in FIG. 16 are input to the control logic circuit 63 on the basis of stop data corresponding to the eight steps. When the PF motor 5 is driven in the 1-2-phase excitation mode, theoretically, the rotor 41 stops at the first stop position 71 or the second stop position 72. Therefore, in this case, in the second stop control process, signals corresponding to eight steps from the eighth step to the first step or four steps from the eighth step to the fifth step shown in FIG. 16 are input to the control logic circuit 63 on the basis of stop data corresponding to the eight steps or the four steps. When the PF motor 5 is driven in the W1-2-phase excitation mode, theoretically, the rotor 41 stops at any one of the first stop position 71 to the third stop position 73. Therefore, in this case, in the second stop control process, signals corresponding to any one of two steps, four steps, sixth steps, and eight steps are input to the control logic circuit 63. When the PF motor 5 is driven in the 2W1-2-phase excitation mode, theoretically, the rotor 41 stops at any one of the first stop position 71 to the fourth stop position 74. Therefore, in this case, in the second stop control process, signals corresponding to any one of one step to eight steps are input to the control logic circuit 63.

When the stop control process is performed in this way, the inventors' studies show that the stop accuracy of the rotor 41 is lowered except when the rotor 41 stops at the first stop position 71, which is a target stop position.

First, the inventors' studies show that, when the PF motor driving circuit 58 according to this embodiment is used to drive the PF motor 5, as shown in FIGS. 17A and 17B, positional deviation occurs between the rotational position θ1, that is, the electrical angle of the rotor 41 in theory and the actual rotational position θ2, that is the actual electrical angle of the rotor 41 specified from the current C1 actually supplied to the A-phase driving coil 48 and the current C2 actually supplied to the B-phase driving coil 49.

As a result, as represented by a two-dot chain line in FIG. 17A, from the viewpoint of the characteristics of the PF motor driving circuit 58, a stop error occurs with respect to the target stop position except when the rotor 41 stops at the first stop position 71 (positions corresponding to step Nos. 0, 16, 32, and 48) and the second stop position 72 (positions corresponding to step Nos. 8, 24, 40, and 56). That is, as represented by a two-dot chain line in FIG. 17B, an angle error occurs with respect to a target stop angle except when the rotor 41 stops at the first stop position 71 and the second stop position 72.

As described above, in this embodiment, currents are supplied to the A-phase driving coil 48 and the B-phase driving coil 49 such that the dodecagon represented by a two-dot chain line in FIG. 8B is formed by the resultant vector V. Therefore, as shown in FIG. 14A, the current C1 and the current C2 are changed in angular sine-wave shapes.

As represented by a dotted line in FIG. 17A, a large positional deviation occurs between the actual stop position and the target stop position due to mechanical loads, such as loads between the small gear 36 and the large gears 35 and 37, a transport load of the printing sheet P, and the detent torque of the PF motor 5, in addition to the characteristics of the motor driving circuit 58, except when the rotor 41 stops at the first stop position 71, which is the target stop position. That is, as represented by a dotted line in FIG. 17B, a large positional deviation occurs between the actual stop position and the target stop position except when the rotor 41 stops at the first stop position 71, which is the target stop position. In FIGS. 17A and 17B, the measured results of the stop angles of the stop errors when the PF motor is driven in 4W1-2-phase excitation mode are linked to each other by a dotted line. In FIG. 17A, white rectangles indicate the stop errors when the PF motor is driven in the W1-2-phase excitation mode.

More specifically, when the rotor 41 stops at positions corresponding to steps from step No. 1 to step No. 8, steps from step No. 17 to step No. 24, steps from step No. 33 to step No. 40, and steps from step No. 49 to step No. 56, which are target stop positions, actually, the rotor 41 stops before the target stop positions in the direction in which the rotor 41 rotates. That is, in this case, the rotor 41 does not reach the target stop positions. When the rotor 41 stops at positions corresponding to steps from step No. 9 to step No. 15, steps from step No. 25 to step No. 31, steps from step No. 41 to step No. 49, and steps from step No. 57 to step No. 63, which are target stop positions, actually, the rotor 41 stops after the target stop positions in the direction in which the rotor 41 rotates. That is, in this case, the rotor 41 passes the target stop positions.

In the stop control process according to this embodiment, when the PF motor 5 is driven in any one of the 2-phase excitation mode, the 1-2-phase excitation mode, and W1-2-phase excitation mode, a stop instruction, which is a control instruction for stopping the rotor 41 at a position that is beyond the target stop position by a step angle (that is, theoretically, an electrical angle of 11.25°) during the 2W1-2-phase excitation mode in the direction in which the rotor 41 rotates, is given to the PF motor driving circuit 58. That is, in the stop control process according to this embodiment, an instruction unit including the CPU 52, the ROM 53, the RAM 54, the non-volatile memory 55, and the ASIC 56 gives the PF motor driving circuit 58 the stop instruction for stopping the rotor 41 at a position that is beyond the target stop position by a step angle in the 2W1-2-phase excitation mode. More specifically, after the second stop control process, a signal, which corresponds to one step in the 2W1-2-phase excitation mode, for rotating the rotor 41 is input to the control logic circuit 63. In addition, after the second stop control process, a digital signal corresponding to the sum of the current C1 and the current C2 and digital signals corresponding to the ratio of the current C1 and the ratio of the current C2 to the sum, which correspond to one step in the 2W1-2-phase excitation mode, are input to the control logic circuit 63. However, for simplicity of explanation, it is assumed that the digital signals corresponding to the ratio of the current C1 and the ratio of the current C2 to the sum are input to the control logic circuit 63.

That is, when the PF motor is driven in the 2-phase excitation mode, signal No. 16 for stopping the rotor 41 at the first stop position 71, which is a target stop position, is input to the control logic circuit 63 on the basis of stop data corresponding to the first step shown in FIG. 16, and then a signal corresponding to one step in the 2W1-2-phase excitation mode (that is, signal No. 18) is input to the control logic circuit 63.

When the PF motor is driven in the 1-2-phase excitation mode, signal No. 8 for stopping the rotor 41 at the second stop position 72, which is a target stop position, is input to the control logic circuit 63 on the basis of stop data corresponding to the fifth step shown in FIG. 16, and then a signal corresponding to one step in the 2W1-2-phase excitation mode (that is, signal No. 10) is input to the control logic circuit 63. Alternatively, when the PF motor is driven in the 2-phase excitation mode, signal No. 16 for stopping the rotor 41 at the first stop position 71, which is a target stop position, is input to the control logic circuit 63 on the basis of stop data corresponding to the first step shown in FIG. 16, and then a signal corresponding to one step in the 2W1-2-phase excitation mode (that is, signal No. 18) is input to the control logic circuit 63.

When the PF motor is driven in the W1-2-phase excitation mode, signal No. 4 (or signal No. 12) for stopping the rotor 41 at the third stop position 73, which is a target stop position, is input to the control logic circuit 63 on the basis of stop data corresponding to the seventh step (or the third step) shown in FIG. 16, and then a signal corresponding to one step in the 2W1-2-phase excitation mode (that is, signal No. 6 (or signal No. 14)) is input to the control logic circuit 63. Alternatively, signal No. 8 for stopping the rotor 41 at the second stop position 72, which is a target stop position, is input to the control logic circuit 63 on the basis of stop data corresponding to the fifth step shown in FIG. 16, and then a signal corresponding to one step in the 2W1-2-phase excitation mode (that is, signal No. 10) is input to the control logic circuit 63; or signal No. 16 for stopping the rotor 41 at the first stop position 71, which is a target stop position, is input to the control logic circuit 63 on the basis of stop data corresponding to the first step shown in FIG. 16, and then a signal corresponding to one step in the 2W1-2-phase excitation mode (that is, signal No. 18) is input to the control logic circuit 63.

When the PF motor is driven in the W1-2-phase excitation mode, the actual stop position of the rotor 41 by the stop control process according to this embodiment is checked. As a result, as represented by circles in FIGS. 17A and 17B, when the second stop positions 72 other than the third stop positions 73 corresponding to step Nos. 4, 20, 36, and 52 or the third stop positions 73 are set as the target stop positions, a stop error with respect to the target stop position (deviation between the actual stop angle and a target stop angle) is substantially equal to that in a stop control process of giving the PF motor driving circuit 58 no stop instruction for stopping the rotor at a position that is beyond the target stop position by a step angle in the 2W1-2-phase excitation mode. That is, when the third stop position 73 or the second stop positions 72 corresponding to step Nos. 8, 12, 24, 28, 40, 44, 56, and 60 are set as the target stop positions, the actual stop angle is little changed.

Meanwhile, in the stop control process according to this embodiment, as represented by circles in FIGS. 17A and 17B, when the third stop positions 73 corresponding to step Nos. 4, 20, 36, and 52 are set as the target stop positions, the stop error with respect to the target stop positions are considerably reduced. That is, in this case, the deviation between the actual stop angle and the target stop angle is considerably reduced. More specifically, in the stop control process according to this embodiment, the stop errors when the third stop positions 73 corresponding to step Nos. 4, 20, 36, and 52 are set as the target stop positions are reduced from about 18% to about 12%. That is, in the stop control process according to this embodiment, the stop errors when the third stop positions 73 corresponding to step Nos. 4, 20, 36, and 52 are set as the target stop positions are reduced to two thirds. More specifically, when the third stop positions 73 corresponding to step Nos. 4, 20, 36, and 52 are set as the target stop positions, in the related art, the rotor 41 stops a mechanical angle of about 1.35° ahead of the target stop position. However, when the stop control process according to this embodiment, the rotor 41 stops a mechanical angle of about 0.9° ahead of the target stop position, and the stop position of the rotor 41 is close to the target stop position by a mechanical angle of about 0.45°.

Main Effects of this Embodiment

As described above, in this embodiment, in the driving control process including the acceleration control process, the uniform speed control process, and the deceleration control process, the PF motor 5 is driven in the 1-2-phase excitation mode that theoretically rotates the rotor 41 at a step angle of 45°, which is an electrical angle, and the W1-2-phase excitation mode that theoretically rotates the rotor 41 at a step angle of 22.5°, which is an electrical angle. In addition, the PF motor 5 can be driven in the 2W1-2-phase excitation mode that theoretically rotates the rotor 41 at a step angle of 11.25°, which is an electrical angle. Further, the PF motor 5 can be driven in the 4W1-2-phase excitation mode that theoretically rotates the rotor 41 at a step angle of 5.625°, which is an electrical angle, by setting data in the 4W1-2-phase excitation mode on the alignment operation table, the preliminary acceleration table, and the stop operation table. That is, the PF motor 5 is driven in the 1-2-phase excitation mode and the W1-2-phase excitation mode by the PF motor driving circuit 58. The PF motor 5 is driven in the 2W1-2-phase excitation mode by the PF motor driving circuit 58, and predetermined setting makes it possible to drive the PF motor 5 in the 4W1-2-phase excitation mode. Therefore, it is possible to drive the PF motor with high resolution without changing the mechanical structure of the PF motor 5 or the printer 1.

For example, in this embodiment, the PF motor 5 has a total of 48 magnetic poles including 24 A-phase magnetic poles 46 and 24 B-phase magnetic poles 47. Therefore, when the PF motor 5 is driven in the 1-2-phase excitation mode, the resolution of the PF motor 5 is 11.25° in mechanical angle. When the PF motor 5 is driven in the W1-2-phase excitation mode, the resolution of the PF motor 5 is 5.625° in mechanical angle. When the PF motor 5 is driven in the 2W1-2-phase excitation mode, the resolution of the PF motor 5 is 2.8125° in mechanical angle. When the PF motor 5 is driven in the 4W1-2-phase excitation mode, the resolution of the PF motor 5 is 1.09125° in mechanical angle. As described above, the PF driving roller 6 and the paper discharge driving roller 15 have a circumference of 1 inch, and the gear ratio of the large gear 35 or 37 to the small gear 36 is 1:7.5. Therefore, when the PF roller is driven in the 1-2-phase excitation mode, the resolution of the printer 1 is 720 dpi. When the PF roller is driven in the W1-2-phase excitation mode, the resolution of the printer 1 is 1440 dpi. When the PF roller is driven in the 2W1-2-phase excitation mode, the resolution of the printer 1 is 2880 dpi. When the PF roller is driven in the 4W1-2-phase excitation mode, the resolution of the printer 1 is 5760 dpi.

In this embodiment, when the PF motor 5 is driven in the 2-phase excitation mode, the 1-2-phase excitation mode, and the W1-2-phase excitation mode, in the step control process, a stop instruction for stopping the rotor 41 at a position that is beyond the target stop position by a step angle (that is, theoretically, an electrical angle of 11.25°) in the 2W1-2-phase excitation mode is given to the PF motor driving circuit 58. That is, an instruction unit including, for example, the CPU 52 and the ASIC 56 gives the PF motor driving circuit 58 the stop instruction for stopping the rotor 41 at a position that is beyond the target stop position by a step angle of the 2W1-2-phase excitation mode. Therefore, even when the PF motor 5 is driven in the W1-2-phase excitation mode to improve the resolution thereof, it is possible to reduce the stop error of the rotor 41, as described above. That is, in this embodiment, it is possible to prevent the stop accuracy of the PF motor 5 from being lowered while improving the resolution of the PF motor 5. As a result, the printer 1 can use an inexpensive stepping motor as the PF motor 5, and perform printing with high resolution.

Further, in the driving control process according to this embodiment, since the PF motor 5 can be driven in the 2-phase excitation mode, the PF motor 5 can be rotated at a higher speed than when the PF motor 5 is driven in the W1-2-phase excitation mode. As a result, in the printer 1 according to this embodiment, at the time of the feeding of sheets before printing or the discharge of sheets after printing, the PF motor 5 is driven in the 2-phase excitation mode to transport the printing sheet P at a high speed, which makes it possible to prevent the lowering of the printing speed. Even when high resolution is not needed, the PF motor 5 can be driven in the 2-phase excitation mode to transport the printing sheet P at a high speed, which makes it possible to prevent the lowering of the printing speed.

In the stop control process according to this embodiment, the stop instruction for stopping the rotor 41 at a position that is beyond the target stop position by a step angle in the 2W1-2-phase excitation mode is given to the PF motor driving circuit 58 in order to stop the rotor 41 at the first stop position 71, which is a stable position, and to stop the rotor 41 at the second stop position 72 and the third stop position 73, which are unstable positions. Therefore, it is possible to perform the stop control process regardless of the stop position of the rotor 41, and the control process is simplified.

Other Embodiments

The above-described embodiment is just an illustrative example, but the invention is not limited thereto. Various modifications and changes of the invention can be made without departing from the scope and spirit of the invention.

In the stop control process according to the above-described embodiment, the stop instruction for stopping the rotor 41 at a position that is beyond the target stop position by a step angle in the 2W1-2-phase excitation mode is given to the PF motor driving circuit 58 in order to stop the rotor 41 at the first stop position 71, which is a stable position, and to stop the rotor 41 at the second stop position 72 and the third stop position 73, which are unstable positions. However, for example, when the rotor 41 stops at the first stop position 71 serving as a target stop position, as shown in FIGS. 17A and 17B, there is little deviation between the actual stop position and the target stop position. Therefore, only when the rotor 41 stops at an unstable position as a target stop position, the stop instruction for stopping the rotor 41 at a position that is beyond the target stop position by a step angle in the 2W1-2-phase excitation mode may be given to the PF motor driving circuit 58.

In the stop control process according to the above-described embodiment, the stop instruction for stopping the rotor 41 at a position that is beyond the target stop position by a step angle in the 2W1-2-phase excitation mode is given to the PF motor driving circuit 58, but the invention is not limited thereto. For example, in the stop control process, a stop instruction for stopping the rotor 41 at a position that is beyond the target stop position by a step angle in the 4W1-2-phase excitation mode (that is, theoretically, an electrical angle of 5.625°) may be given to the PF motor driving circuit 58. In this case, even when the PF motor is driven in the 2W1-2-phase excitation mode, the above-mentioned stop control process can be performed. For example, signal No. 2 for stopping the rotor 41 at the fourth stop position 74, which is a target stop position, may be input to the control logic circuit 63 on the basis of stop data corresponding to the eighth step shown in FIG. 16, and then a signal (that is, signal No. 3) corresponding to one step in the 4W1-2-phase excitation mode may be input to the control logic circuit 63. This structure makes it possible to perform the above-mentioned stop control process even when the PF motor is driven in 2W1-2-phase excitation mode.

Further, in the stop control process, a stop instruction for stopping the rotor 41 at a position that is beyond a target stop position by a minute step angle (for example, theoretically, an electrical angle of $2.8125° (=(360/2^7)°)$ or an electrical angle of $1.40625° (=(360/2^8)°)$ may be given to the PF motor driving circuit 58. In this case, even when the PF motor is driven in the 4W1-2-phase excitation mode, the above-mentioned stop control process can be performed. Further, when the PF motor is driven in only the 1-2-phase excitation mode, in the stop control process, a stop instruction for stopping the rotor 41 at a position that is beyond a target stop position by a step angle in the W1-2-phase excitation mode (that is, theoretically, an electrical angle of 22.5°) may be given to the PF motor driving circuit 58.

That is, in the stop control process, a stop instruction for stopping the rotor 41 at a position that is behind a target stop position by a minuter step angle than the step angle in the driving control process may be given to the PF motor driving circuit 58. That is, when the step angle in the driving control process is theoretically $(360/2^{(n2+2)})°$ (n2 is an integer equal to or greater than 1) in electrical angle, in the stop control process, a stop instruction for stopping the rotor 41 at a position that is beyond a target stop position by an electrical angle of $(360/2^{(n2+n3)})°$ (n3 is an integer equal to or greater than 3) may be given to the PF motor driving circuit 58. In this way, even when the PF motor 5 is driven in, for example, the 1-2-phase excitation mode, the W1-2-phase excitation mode, or the 2W1-2-phase excitation mode to improve the resolution, it is possible to prevent the stop accuracy from being lowered.

In the stop control process, a stop instruction for stopping the rotor 41 at a position that is beyond a target stop position by, theoretically, an electrical angle of $(360/2^{(n2+3)})°$ in the direction in which the rotor 41 rotates may be given to the PF motor driving circuit 58. For example, when the PF motor is driven in the W1-2-phase excitation mode (that is, when the step angle in the driving control process is $22.5° (=(360/2^4)°)$, a stop signal in the stop control process may be a control signal for stopping the rotor 41 at a position that is beyond a target stop position by, theoretically, an electrical angle of $11.25° (=(360/2^5)°)$. In this case, a control process of generating a stop instruction for stopping the rotor 41 at a position that is beyond a target stop position by half the step angle in the driving process maybe performed, which results in a simple control process.

In the above-described embodiment, even when the PF motor is driven in the 2-phase excitation mode, the stop instruction for stopping the rotor 41 at a position that is beyond a target stop position by a step angle in the 2W1-2-phase excitation mode is given to the PF motor driving circuit 58. However, for example, when the rotor 41 stops at the first stop position 71 serving as a target stop position, as shown in FIGS. 17A and 17B, there is little deviation between the actual stop position and the target stop position. Therefore, when the PF motor is driven in the 2-phase excitation mode, in the stop control process, a stop instruction for stopping the rotor 41 at a position that is beyond the target stop position by a step angle in the 2W1-2-phase excitation mode may be given to the PF motor driving circuit 58. In addition, even when the PF motor is driven in the 1-2-phase excitation mode, in the stop control process, a stop instruction for stopping the rotor 41 at a position that is beyond the target stop position by a step angle in the 2W1-2-phase excitation mode may be given to the PF motor driving circuit 58.

In the above-described embodiment, in the acceleration control process, a common acceleration table is used for the 2-phase excitation mode, the 1-2-phase excitation mode, the W1-2-phase excitation mode, and the 2W1-2-phase excitation mode, but the invention is not limited thereto. Different acceleration tables may be used for the excitation modes, and the acceleration control process may be performed on the basis of each acceleration table. In this case, the preliminary acceleration table may not be provided. Similarly, in the above-described embodiment, in the deceleration control process, a common deceleration table is used for the 2-phase excitation mode, the 1-2-phase excitation mode, the W1-2-phase excitation mode, and the 2W1-2-phase excitation mode, but the invention is not limited thereto. Different deceleration tables may be used for the excitation modes, and the deceleration control process may be performed on the basis of each acceleration table. In this case, the stop operation table is not provided, but stop operation data may be set on the deceleration table.

In the stop control process according to the above-described embodiment, the stop instruction for stopping the rotor 41 at a position that is beyond a target stop position by a step angle in the 2W1-2-phase excitation mode is given to the PF motor driving circuit 58, but the invention is not limited thereto. For example, in the stop control process, a stop instruction for stopping the rotor 41 at a position that is before a target stop position by a step angle in the 2W1-2-phase excitation mode may be given to the PF motor driving circuit 58. As shown in FIGS. 17A and 17B, the rotor 41 may stop at a position that is beyond a target stop position in the direction in which the rotor 41 rotates. In this case, this structure makes it possible to reduce the stop error of the rotor 41.

In the printer 1 according to the above-described embodiment, the rotor 41 is likely to stop before a target stop position due to mechanical loads, such as loads between the small gear 36 and the large gears 35 and 37 and a transport load of the printing sheet P. Therefore, in the printer 1 according to the above-describe embodiment, a stop instruction in the stop control process may be a control instruction for stopping the rotor 41 at a position that is beyond the target stop position in the direction in which the rotor 41 rotates.

In the above-described embodiment, the PF motor 5 is given as an illustrative example, but the invention is not limited thereto. For example, when the printer 1 is provided with a stepping motor other than the PF motor 5, the structure of the above-described embodiment may be applied to the stepping motor other than the PF motor 5. For example, when a stepping motor is used as the CR motor 4, the structure of the above-described embodiment may be applied to the CR motor 4.

In the above-described embodiment, the 2-phase stepping motor is used as the PF motor 5, but the invention is not limited thereto. For example, the structure of the above-described embodiment may be applied to stepping motors other than the 2-phase stepping motor (for example, a 3-phase stepping motor and a 4-phase stepping motor).

In the above-described embodiment, the printer 1, which is an ink jet printer, is given as an example, but the invention is not limited thereto. For example, the structure of the above-described embodiment may be applied to laser printers. In addition, the structure of the above-described embodiment may be applied to apparatuses having transport mechanisms using stepping motors, such as a facsimile and a document scanner, in addition to the printers.

What is claimed is:

1. A method of controlling a stepping motor, comprising:
    performing a driving control of driving a rotor at a predetermined step angle; and
    performing a stop control of giving a driving circuit of the stepping motor a stop instruction for stopping the rotor at a position that is before or beyond a target stop position by a smaller step angle than the step angle in the driving control in a direction in which the rotor is rotated when to stop the rotor at the target stop position.

2. A printer comprising a stepping motor controlled by the control method according to claim 1 as a motor for transporting a printing medium.

3. The printer according to claim 2, wherein the stop instruction is a control instruction for stopping the rotor at a position that is beyond the target stop position in the direction in which the rotor is rotated.

4. A method of controlling a 2-phase stepping motor including A-phase and B-phase magnetic pole sets arranged with a phase difference corresponding to an electrical angle of 90° and driving coils wound around each of the two magnetic pole sets, the method comprising: if a stop position of a rotor is referred to as a stable position when the stepping motor is driven in a 2-phase excitation mode in which the rotor is theoretically rotated at a step angle of 90° in electrical angle, and stop positions of the rotors except for the stable position are referred to as unstable positions when the stepping motor is driven in an excitation mode in which the rotor is theoretically rotated at a step angle of $(360/2^{(n1+2)})°$ in electrical angle wherein n1 is an integer equal to or greater than 1, performing a driving control of driving the stepping motor in an excitation mode in which the rotor is theoretically rotated at a step angle of $(360/2^{(n2+2)})$ in electrical angle wherein n2 is an integer equal to or greater than 1; and after the driving control, when the rotor stops at the target stop position that is the unstable position, performing a stop control of giving a driving circuit of the stepping motor a stop instruction for stopping the rotor at a position that is before or beyond the target stop position by, theoretically, a step angle of $(360/2^{(n2+n3)})$ in electrical angle in a direction in which the rotor is rotated wherein n3 is an integer equal to or greater than 3.

5. The method of controlling a stepping motor according to claim 4, wherein the stop instruction is a control instruction for stopping the rotor at a position that is before or beyond the target stop position by, theoretically, a step angle of $(360/2^{(n2+3)})°$ in electrical angle, in the direction in which the rotor is rotated.

6. The method of controlling a stepping motor according to claim 4, wherein, in the stop control, the stop instruction is given to the driving circuit to stop the rotor at the stable position and the unstable position.

7. A printer comprising a stepping motor controlled by the control method according to claim 4 as a motor for transporting a printing medium.

8. An apparatus for controlling a stepping motor, comprising: a driving unit that rotates a rotor at a predetermined step angle; and an instruction unit that gives the driving unit a stop instruction for stopping the rotor at a position that is before or beyond a target stop position by a smaller step angle than the step angle during the rotation of the rotor in a direction in which the rotor is rotated to stop the rotor at the target stop position.

9. A printer comprising a stepping motor controlled by the control apparatus according to claim 8 as a motor for transporting a printing medium.

* * * * *